United States Patent [19]
Hudspeth et al.

[11] 3,893,116
[45] July 1, 1975

[54] RADAR LOBING SYSTEM

[75] Inventors: Thomas Hudspeth, Malibu; Walter W. Maguire, Los Angeles; Harold A. Rosen, Santa Monica; Donald E. Kreinheder, Inglewood, all of Calif.

[73] Assignee: Hughes Aircraft Company, Culver City, Calif.

[22] Filed: Dec. 30, 1958

[21] Appl. No.: 783,994

[52] U.S. Cl. ........ 343/16 M; 333/21 A; 343/100 PE
[51] Int. Cl. .......................... G01s 9/22; H01q 15/24
[58] Field of Search ....... 343/5, 16, 7.4, 16.1, 16 M, 343/100 PE; 333/6, 21, 21 A, 98 M; 332/44, 43 B, 51 W; 179/15

[56] References Cited
UNITED STATES PATENTS

| | | |
|---|---|---|
| 2,873,443 | 2/1959 | Raboy .................................. 343/16 |
| 3,239,836 | 3/1966 | Chubb et al. ................... 343/16 M X |
| 3,696,416 | 3/1972 | Badiano et al. .............. 343/16 M X |

*Primary Examiner*—T. H. Tubbesing
*Attorney, Agent, or Firm*—W. H. MacAllister; W. J. Adam

[57] ABSTRACT

This invention relates to radar systems and particularly to a highly accurate single amplifier channel radar system utilizing a monopulse antenna system to prevent external detection of the lobing frequency, and which carries out modulation of the received echo signals at radio frequency to provide lobing in a simplified manner.

19 Claims, 13 Drawing Figures

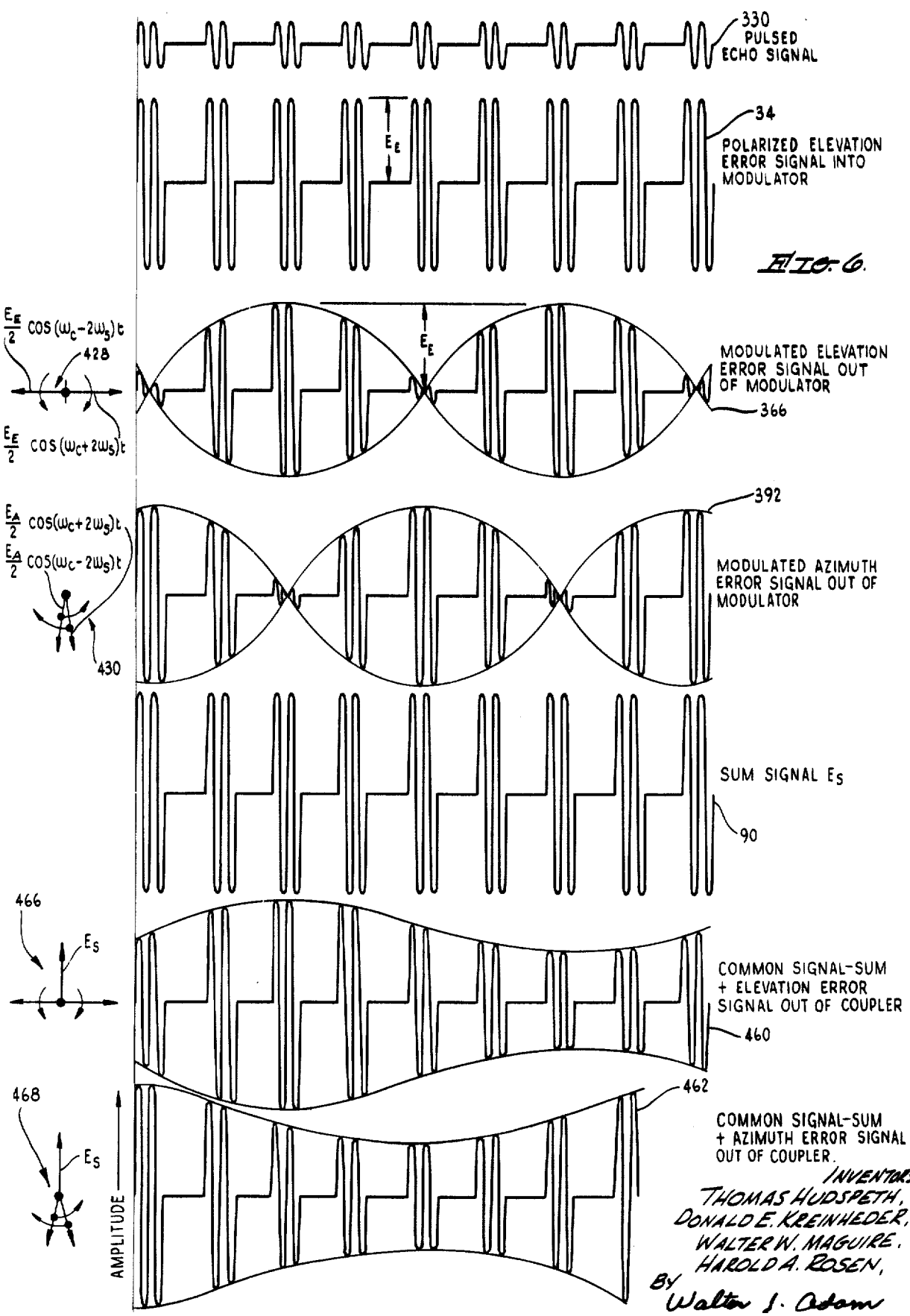

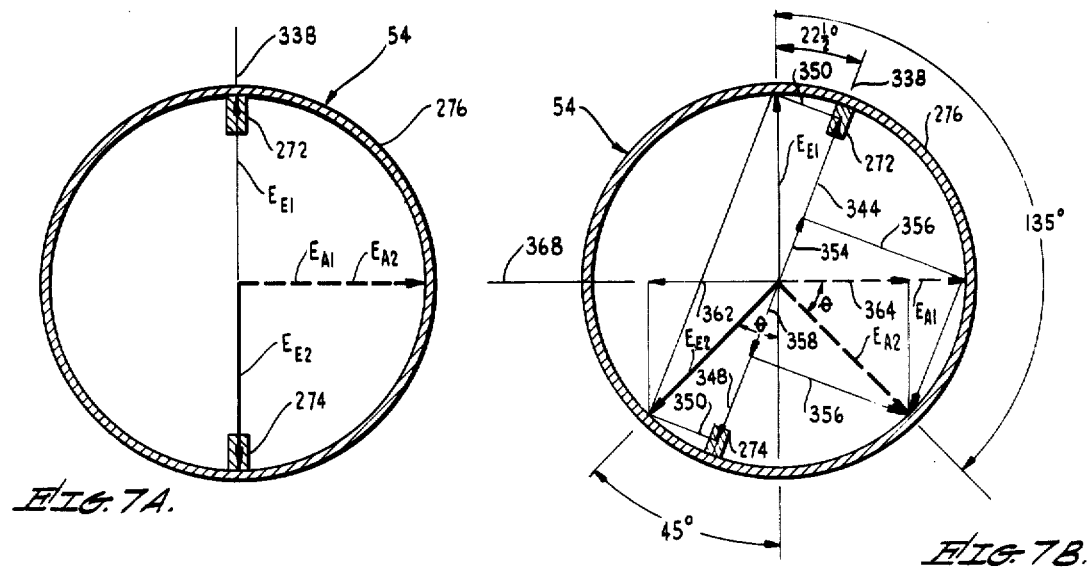
*FIG. 7A.*
*FIG. 7B.*
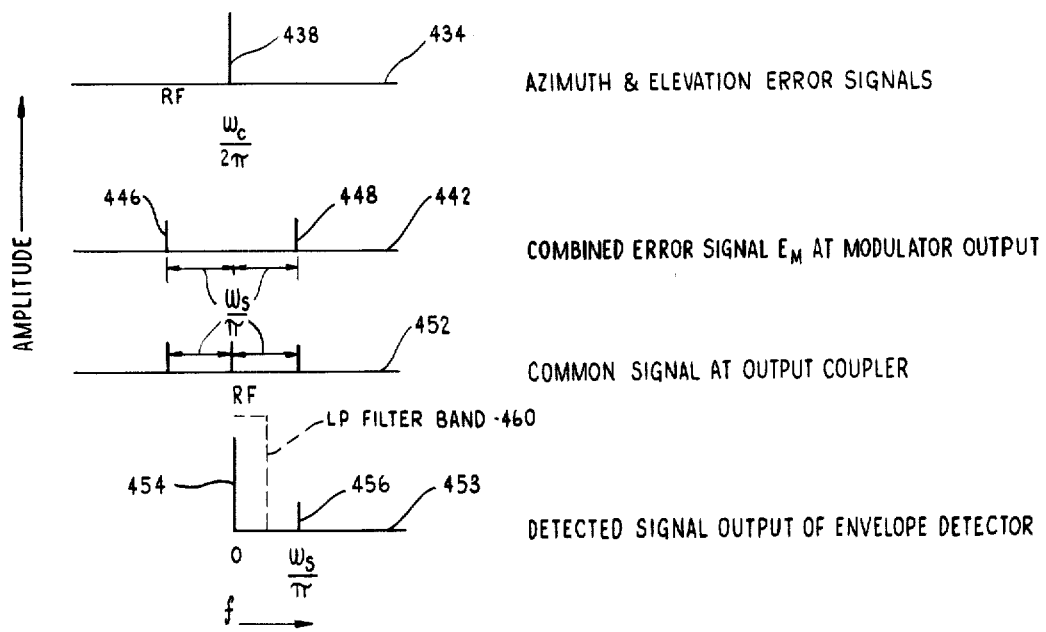
AZIMUTH & ELEVATION ERROR SIGNALS
COMBINED ERROR SIGNAL $E_M$ AT MODULATOR OUTPUT
COMMON SIGNAL AT OUTPUT COUPLER
DETECTED SIGNAL OUTPUT OF ENVELOPE DETECTOR
*FIG. 9.*
INVENTORS.
THOMAS HUDSPETH,
DONALD E. KREINHEDER,
WALTER W. MAGUIRE,
HAROLD A. ROSEN,
BY
Walter J. Adam
ATTORNEY.

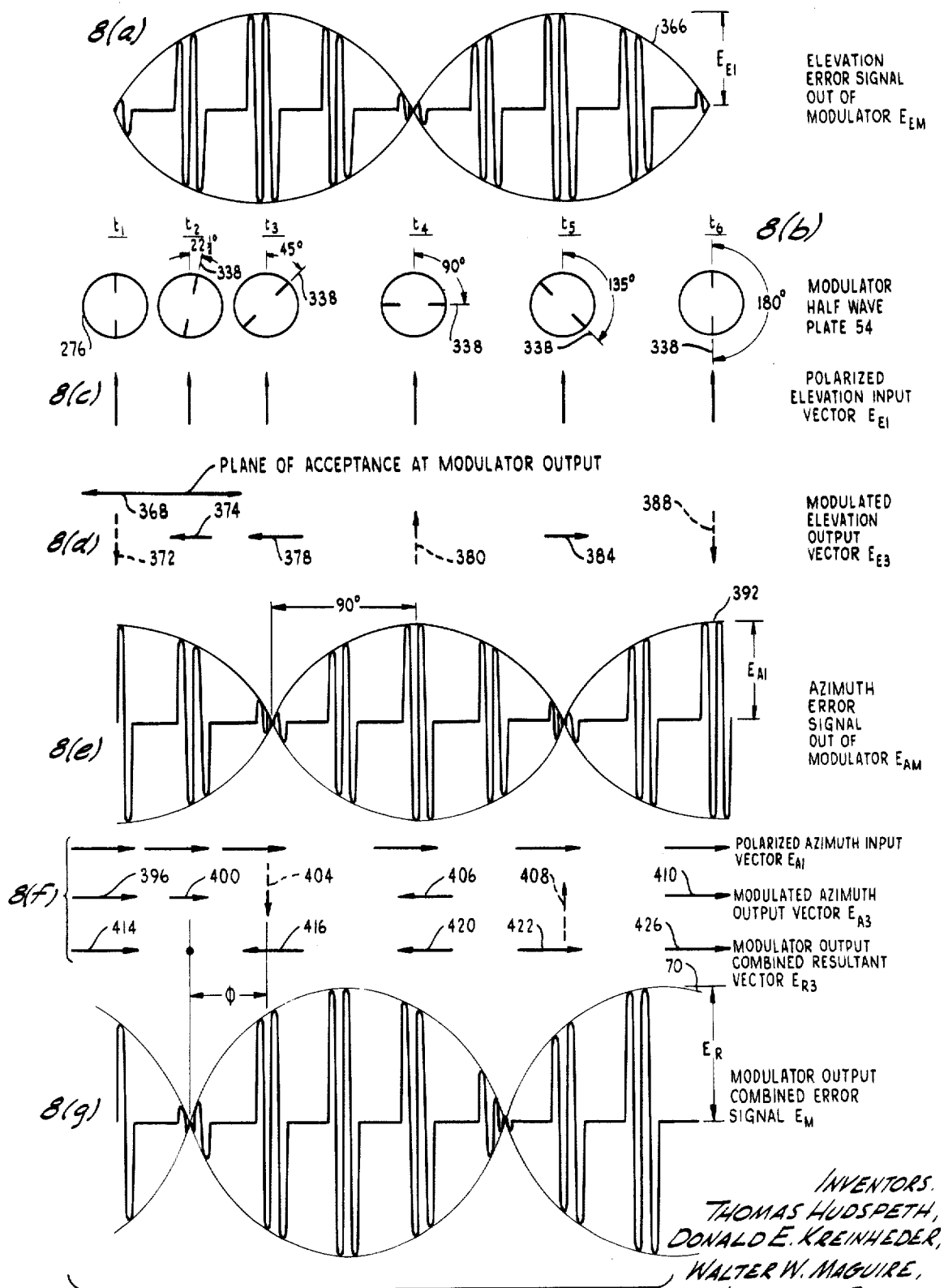

RADAR LOBING SYSTEM

In the prior art monopulse radar systems, target angular coordinates have been obtained by combining the echo signals received in four horns of a nonrotating monopulse antenna into receiver input signal combinations such as sum and difference signals, and heterodyning the signals to intermediate frequency. Three or four separate channels and IF (intermediate frequency) amplifiers are utilized to amplify and to pass the IF signals through the receiver. The IF signals are then detected and processed to obtain a measure of the relative amplitude of the signals received by the antenna, and therefore, a measure of the angular displacement of the antenna axis from the line of sight to the source of the signals, that is, the target. One disadvantage of this arrangement is that a plurality of IF amplifier circuits are required which must be matched in either phase or amplitude gain or both to accurately retain the information received from the antenna. In order to provide IF amplifiers which meet these requirements, a large number of amplifier components of a high degree of quality are required.

Some systems have combined or multiplexed the IF input signals so as to pass them through a common amplifier channel. The multiplexing operation is in effect lobing of the received echo signals. These multiplexing systems may require a large number of components such as separate oscillator means and balanced modulators to carry out the multiplexing operation. In addition, these multiplexing systems may be susceptible to interfering or jamming signals. Some multiplexing systems which utilize narrow band filters to remove jamming signals have the disadvantage that they cannot be used with pulsed radar where a wide band spectrum must be conventionally maintained up to the box car detection system.

A radar system which would require a minimum of equipment to combine the input signals so as to utilize a single amplifier channel for providing a highly accurate and reliable system would be an advance in the art. In addition a system carrying out lobing of the received echo signal to prevent external detection of the lobing frequency, by modulating and combining the input signals such as the sum and difference signals at radio frequency without utilization of devices such as vacuum tubes, would be an improvement over the art because of its simplicity. Also a radar system that would allow a variation of the frequency of the sideband signals carrying the directional information from the antenna, would provide protection against interfering or jamming signals.

Another feature which would be desirable in a radar system would be to vary the coupling ratio of the error difference signals and the sum or reference signal during different types of operation such as searching and tracking so as to obtain improved performance. Another desirable system would be one that would overcome jamming signals and would operate with either continuous wave, pulse doppler or pulsed radar type signals.

It is therefore an object of this invention to provide a highly accurate radar system which combines the directional error signals into a common signal by a greatly simplified system operating at radio frequency.

It is a further object of this invention to provide a radar system utilizing a monopulse receiving antenna, which system includes an improved and simplified means for combining at microwave or radio frequency the input signals into a common signal for providing simplified and reliable amplification and detection.

It is a still further object of this invention to provide a radar receiver utilizing a monopulse antenna and including a simplified arrangement for providing a variation of the lobing frequency to overcome interfering signals received with the echo signals.

It is another object of this invention to provide a radar system utilizing a monopulse antenna system and a sum and difference network which allows variation of the relative magnitudes of the error signals and the reference signals so as to provide improved performance during different conditions of operation such as during searching and tracking.

According to one feature of this invention, a monopulse antenna intercepts unmodulated radio frequency signals transmitted to and received from a target and combines them so as to develop elevation and azimuth difference signals and a sum signal. The difference signals are polarized in orthogonal planes and passed through a continuously rotating phase shifter of a modulator device so as to continuously rotate the planes of polarization at what may be a variable angular velocity. The rotated planes are then passed to a polarization direction sensitive element which accepts only cosine components of the rotating difference signals as a function of the angle between the difference signal and the polarized plane. The polarized sensitive element acts to develop a double sideband suppressed carrier signal with the elevation and azimuth signals modulated in time quadrature in relation to each other. The sideband signals or the modulated error signals are then polarized in planes orthogonal to the sum signal and passed through coupling means for rotating the planes through a preset fixed angle. The polarization sensitive detector accepts the cosine components of the sum and sideband signals as a function of the angle between the difference signal and the plane of the direction sensitive element to form a common signal with the sum signal arranged as the carrier wave. Changing the rotation angle of the coupler allows variation of the coupling ratio of the sum and difference signals to allow improved operation during searching and tracking, for example. The common signal is then heterodyned to intermediate frequency, amplified in a common amplifier and passed to detecting circuits. The detecting circuits utilize a reference signal proportional to the angular velocity of the continuously rotating phase shifter of the modulator for deriving output error signals which accurately indicate target direction relative to the antenna axis.

The novel features of this invention, as well as the invention itself, both as to its organization and method of operation, will best be understood from the accompanying description, taken in connection with the accompanying drawings, in which like reference characters refer to like parts, and in which:

FIG. 6 is a graph showing time versus amplitude for illustrating the waveforms appearing in various positions of the radar system of FIG. 1;

FIGS. 7a and 7b are schematic diagrams illustrating the rotation of the electric vectors of the half wave plate for explaining the rotation of the modulator of FIG. 3;

FIG. 8 is a diagram showing time versus amplitude for further explaining the action of the modulator of FIG. 3;

FIG. 9 is a diagram showing frequency versus amplitude for explaining the operation in relation to the signal spectrum of the radar system of FIG. 1;

Figure 1:
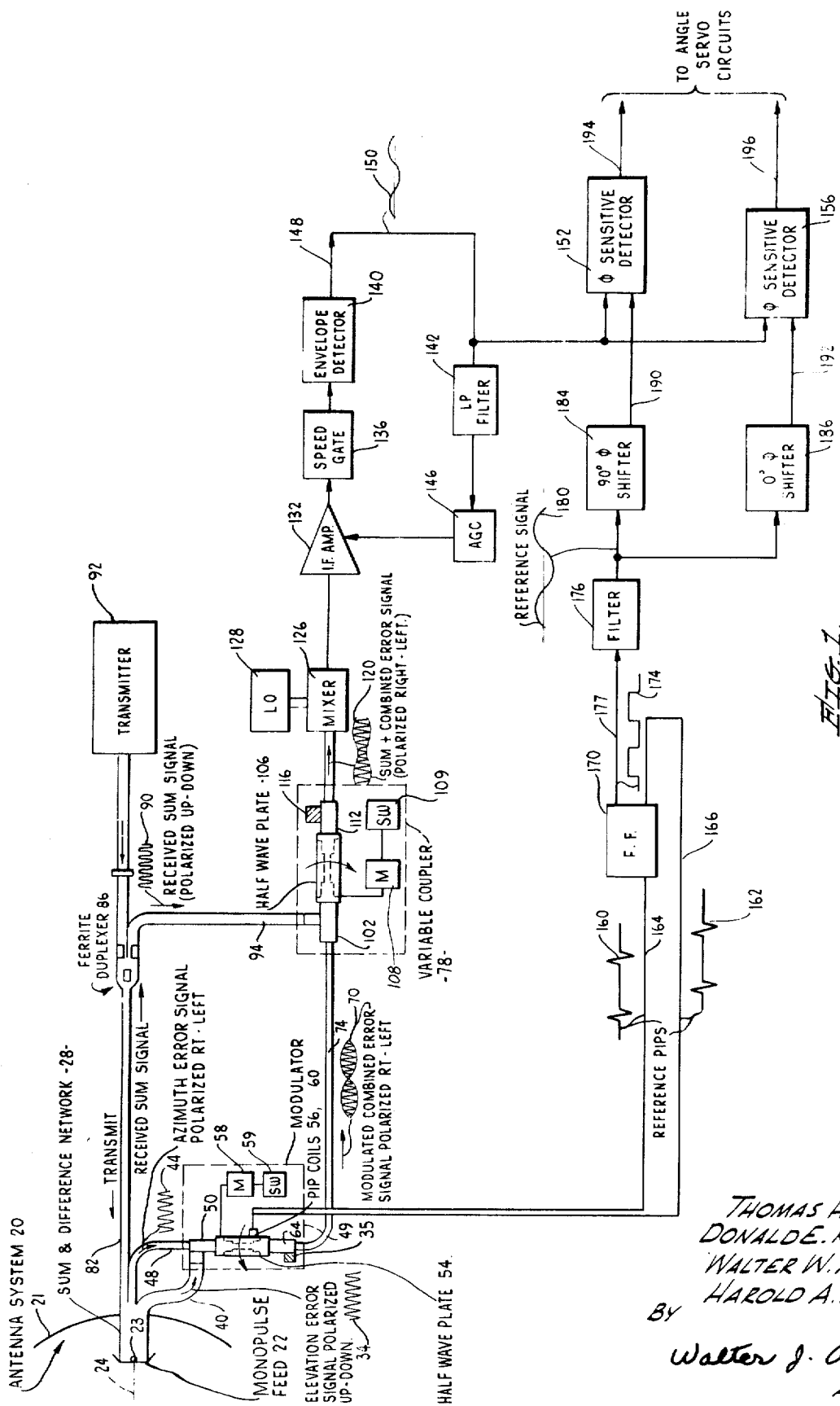
FIG. 1 is a schematic and block diagram of a radar system in accordance with this invention utilized as a pulse doppler type system.

Referring first to FIG. 1, a schematic and block diagram is shown of a radar system in accordance with this invention when operating as a pulsed doppler type radar system. A monopulse antenna system 20 is provided for receiving echo signals in a monopulse feed 22 which may have four feed horns or apertures such as is illustrated generally by an aperture 23. The antenna system 20 may have a central axis 24 indicating the axis of a parabollic reflector 21. The signals intercepted by the group of apertures such as the aperture 23 have relative amplitudes which together are indicative of the azimuth and elevation direction of a target in relation to the axis 24. These signals are passed through a sum and difference network 28 which may be a conventional arrangement including a plurality of magic tees. The sum and difference network 28 in response to the signals from the aperatures act to combine the four signals into an elevation difference error signal, an azimuth difference error signal and a sum or reference signal, all at radio or microwave frequency.

The elevation error signal as shown by a waveform 34 is passed out of the sum and difference network 28 into a microwave waveguide 40 which is arranged so the electric vector of the elevation error signal is linearly polarized in the up-down direction. The directions of polarization given here are used merely for clarity in description and visualization of the operation of the system. The azimuth error signal as shown by a waveform 44 is passed out of the sum and difference network 28 in a microwave waveguide 48 which is arranged so the electric vector is linearly polarized in the right-left direction. The waveguides 40 and 48 then pass the elevation and azimuth error signals of the waveforms 34 and 44 into a modulator device 49.

The waveguides 40 and 48 are connected in the modulator 49 to an orthogonal mode transducer 50 which accepts the elevation and azimuth error signals of the waveforms 34 and 44, polarized at right angles to each other and combines or couples the error signals into an orthogonally polarized signal in a common wave guide section. The orthogonally polarized signal from the transducer 50 is passed to a rotating halfwave plate or phase shifter 54, where, as will be explained subsequently, the planes of polarization of the coupled signal are continuously rotated. A motor 58 which has a variable rate of rotation is connected to provide the continual rotation of the half wave plate 54. The motor 58 may be controlled by a switching means 59. Pip coils 56 and 60 are provided for developing a reference signal as the half wave plate 54 rotates. The reference signals are indicative of the angular frequency of rotation, which frequency is proportional to the modulation frequency as will be explained subsequently. Components of the rotating elevation and azimuth error signals are received at a polarization sensitive (such as a rectangular waveguide) output waveguide section of an orthogonal mode transducer 64 which has its output opening disposed to accept in its dominant mode only components having a right-left polarization. The plane polarized elevation and azimuth error signals which are accepted by the output waveguide section of the transducer 64 are modulated in time quadrature. The combined modulated error signal of the modulated azimuth and elevation error signal is shown by a waveform 70, which combined signal has its electric vector polarized right-left. The modulator 49 also acts to suppress the carrier wave so the combined error signal 70 is arranged spectrally as a double sideband suppressed carrier signal. The signals received from a second output waveguide section of the transducer 64 are terminated in a load 35. The combined error signal of the waveform 70 is then passed from the transducer 64 through a waveguide 74 to a variable coupler device 78.

The sum signal developed in the sum and difference network 28 in response to an intercepted echo signal is passed through a waveguide 82 to a duplexer 86, which sum signal is shown by a waveform 90. The sum signal of the waveform 90 is then passed through the duplexer 86, through a waveguide 94 polarized in the up-down plane, and to the variable coupler device 78.

The duplexer 86 which may be a conventional ferrite duplexer device acts during transmission to pass transmitted signals from a transmitter 92 to the waveguide 82, to the sum and difference network 28 and through the group of apertures such as the aperture 23 of the monopulse feed 22 to be reflected from the parabolic reflector 21 into space. The monopulse feed 22 and the reflector 21 may have characteristics such that a highly directional radiation pattern is developed. The duplexer 86 also acts in a conventional manner to allow the intercepted signals such as the sum signal of the waveform 90 to pass therethrough to the duct 94 during the receiving portion of the transmit-receive cycle of the system, which operation is explained in further detail below.

The variable coupler 78 includes an input orthogonal mode transducer 102 which receives the combined error signal of the waveform 70 having its electric vectors polarized right-left and receives the sum signal, of the waveform 90, having its electric vectors polarized up-down and acts to couple them into a combined orthogonally polarized signal. The orthogonally polarized signal from the transducer 102 is then passed through a half wave plate 106 which is maintained at a desired angle for rotating the planes of polarization a desired number of degrees. A motor 108 controlled by a switching circuit 109 is utilized for varying the desired angle of the half wave plate 106 so as to provide variable coupling of the sum and error signals as will also be explained subsequently. Components of the combined polarized signal after having its planes rotated by the half wave plate 106 are then received in an orthogonal mode transducer 112 arranged so its output waveguide section accepts the right-left vectorial components in its dominant mode. The other output waveguide section of the transducer 112 is sensitive to polarization in the up-down direction and the signal passing thereto is terminated in a suitable terminating load 116.

The components accepted by the output waveguide section of the transducer 112 are the elevation and azimuth electric vectors which form the modulated elevation and azimuth error signals, and the sum signal which signals combine to form a common signal as shown by a waveform 120. The sum signal is combined as the carrier wave to the combined modulated error signal arranged as sideband error signals. The common signal of the waveform 120 is passed through a waveguide to a mixer circuit 126 controlled by a conventional local oscillator circuit 128. The mixer circuit 126 acts to heterodyne the RF (radio frequency) common signal of the waveform 120 to an IF (intermediate frequency) common signal (not shown) which is then passed to an IF amplifier 132. Thus, it can be seen that the sum and difference signals have been combined into the common signal of the waveform 120 for being amplified in a common amplifier 132, thus eliminating the well known phase and amplitude balancing problems associated with a plurality of parallel IF amplifiers.

The amplified signal from the IF amplifier 132 is passed to a speed gate 136 which, as is well known in the art, may be a servo controlled frequency tracking loop which translates the common signal to the pass band of a speed gate filter (not shown). This speed gate filter is a narrow band filter which separates the desired error signal from undesired signals received by the antenna system 21, such as clutter signals. The common IF signal derived from the speed gate 136 is then passed to a conventional envelope detector 140 which acts to shift the carrier wave to a DC (direct current) signal for providing a reference signal while retaining the sideband information at the amplitude modulation frequency of the common signal of the waveform 120. The DC signal derived from the envelope detector 140 is then passed through a low pass filter 142 which essentially passes only the DC signal to an automatic gain control circuit (AGC) 146. The automatic gain control circuit 146 acts in a conventional manner to vary the amplification of the IF amplifier 132 so as to normalize the amplification in response to the varying peak amplitude of the reference or sum signal. Thus the sum signal of the waveform 90 is utilized to provide the reference amplitude for the error signals developed by the sum and difference network 28. The detected sideband error signal derived from the envelope detector 140 is shown by a waveform 150 on the lead 148 and is passed simultaneously to phase sensitive detectors 152 and 156.

Reference signals are derived from the pip coils 56 and 60 which pass reference pips as shown by waveforms 160 and 162 on leads 164 and 166 to opposite inputs of a flip flop 170 which is continuously triggered to its opposite states for developing output pulses as shown by a waveform 174. The output pulses of the waveform 174 are passed to a filter circuit 176 which acts to develop a sinusoidal reference signal as shown by a waveform 180. The reference signal of the waveform 180 is then passed simultaneously through a 90° phase shifter circuit 184 and a zero degree phase shifter circuit 186 to develop reference signals (not shown) on the leads 190 and 192 having a 90° phase relationship. The phase shifter circuits 184 and 186 also act to control the amplitude of the output reference signals. The two reference signals on the leads 190 and 192 are then passed to the respective phase sensitive detectors 152 and 156 for each separating the in phase elevation and azimuth error components from the detected error signal of the waveform 150 so as to develop DC output signals (not shown) on output leads 194 and 196.

As will be explained in detail subsequently, the DC output signals have voltage levels indicative of the relative peak amplitudes of the modulated elevation and azimuth error signal components of the detected error signal of the waveform 150. The DC error signals on the leads 194 and 196 are then passed to angle servo circuits (not shown) which may act to control the direction of the antenna 20 or may act to control the guidance of a craft, for example. Although the system of FIG. 1 in accordance with this invention is described while operating as a pulsed doppler type radar system, it is to be noted that similar circuitry may be utilized with a continuous wave type radar system. Similar circuitry except for the detection system may also be utilized with a pulsed type radar system.

Figure 2:
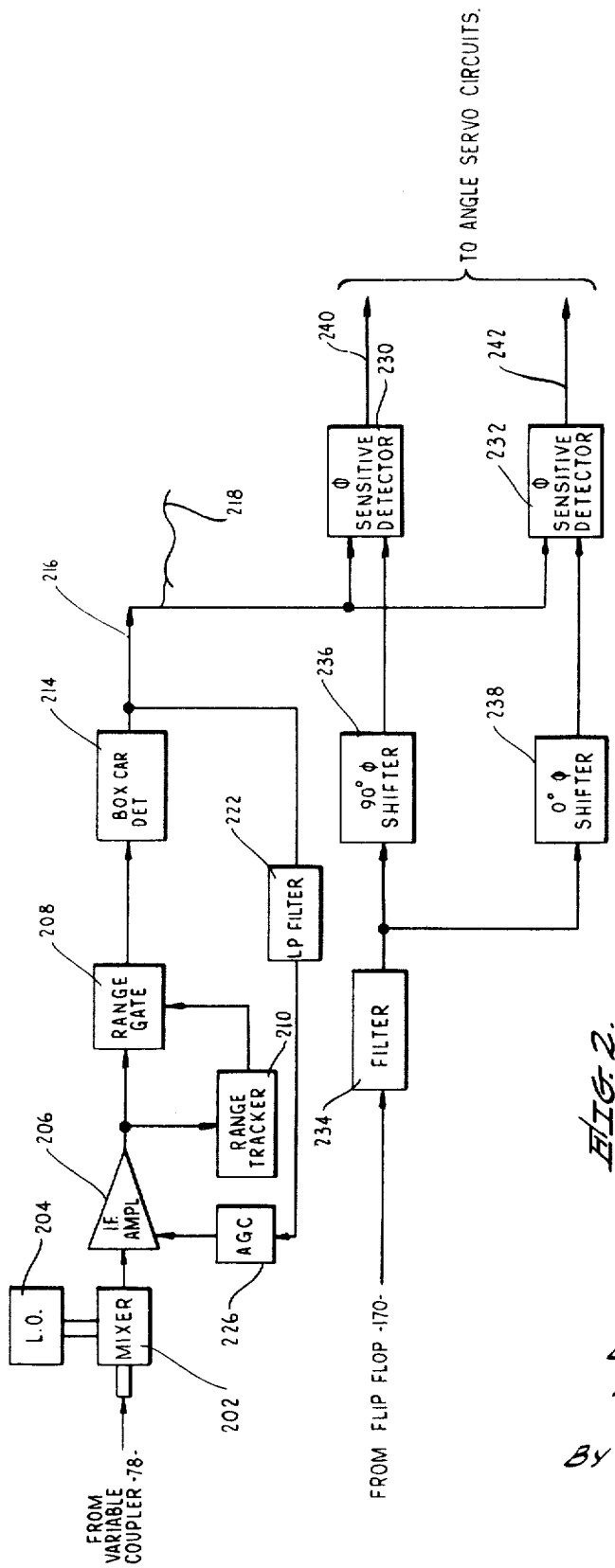
FIG. 2 is a block diagram of a detection system to be utilized with the radar system of FIG. 1 when operating as a pulsed type radar system.

Referring now to FIG. 2, a block diagram is shown in accordance with this invention of a detection system to be utilized with the radar system of the FIG. 1 when operating as a pulsed type radar system. As discussed in relationship to FIG. 1 the common error signal of the waveform 120 at radio frequency is developed in the variable coupler 78. The common error signal similar to the waveform 120 is passed to a mixer circuit 202 where it is heterodyned to an IF signal in response to waves from a local oscillator 204 and is passed through a common IF amplifier 206. The amplified IF signal is then passed to a conventional range gate circuit 208 controlled by a range tracker circuit 210, which range gate circuit may include early and late gate circuits (not shown), as well known in the art. The amplified IF common signal is then passed from the range gate 208 to a box car detector 214 which, as well known in the art, acts to develop an envelope of the sideband error components of the common signal at the modulation frequency, with the sum signal appearing as a DC signal. The box car detector also carries out narrow band filtering to eliminate undesired components such as clutter signals. The detected error signal as shown by a waveform 218 representing the sideband error components and the DC signal (not shown) appear on a lead 216. The DC signal developed by the box car detector 214 is passed through a low pass filter 222 where the modulation components as illustrated by the detected error signal of the waveform 218 are removed. The DC signal derived from the low pass filter 222 is then passed to an automatic gain control (AGC) circuit 226 which has its output terminal connected to the IF amplifier 206 for normalizing its amplification as explained in relation to FIG. 1.

The detected error signal of the waveform 218 containing directional error information is passed simultaneously to phase sensitive detectors 230 and 232. A reference pulse is received from the flip flop 170 as discussed in relation to FIG. 1 and passed to a filter 234. A reference signal similar to the waveform 180 of FIG.

1 is then passed to a 90° phase shifter 236 and a 0° phase shifter 238 to develop reference signals (not shown) 90° out of phase from each other. The reference signals are then passed to the phase sensitive detectors 230 and 232 which each act to separate the in phase elevation and azimuth components from the detected error signal of the waveform 218 to develop DC output signals on output leads 240 and 242, which lead pass to an angle servo circuit as discussed in relation to FIG. 1.

Figure 3:
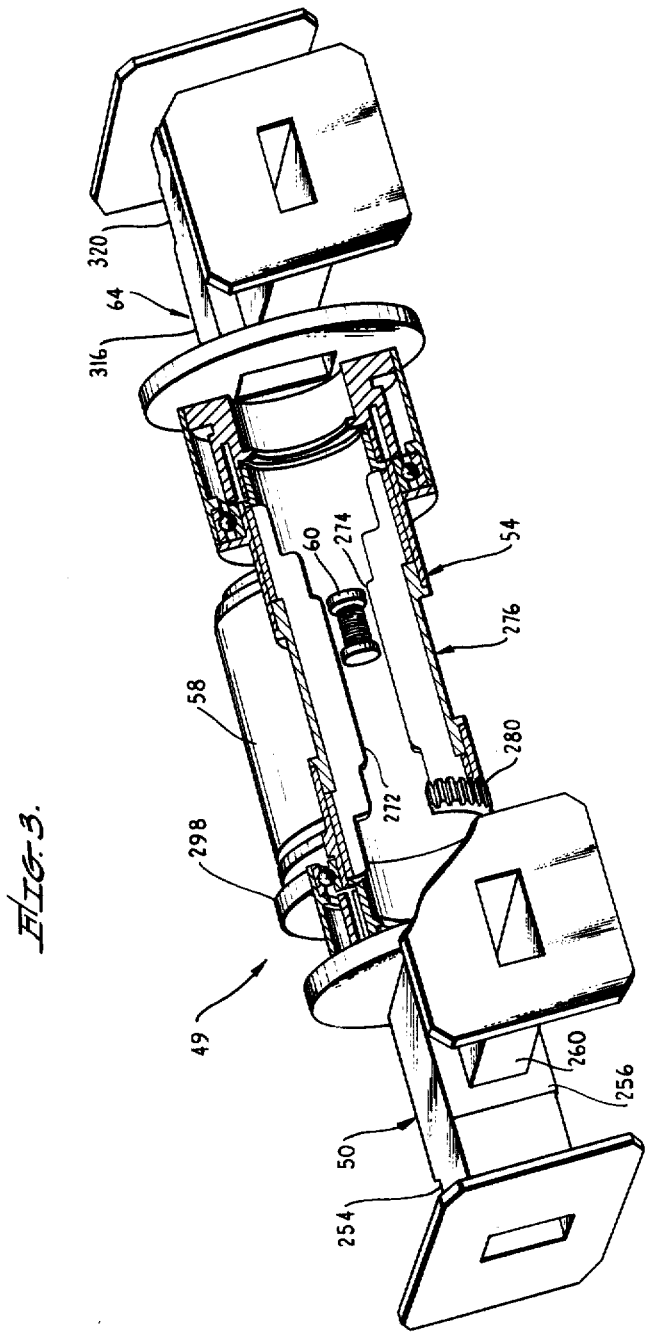
FIG. 3 is a perspective partial sectional view of the modulator of FIG. 1.

Referring now to FIG. 3 which shows a perspective partial sectional view of the modulator of FIG. 1, and referring to FIG. 4 which shows a partial sectional view of the detailed construction of the modulator, the operation of the system in accordance with this invention will be explained in further detail. The modulator 49 includes the orthogonal mode transducer 50 having a square waveguide section 250 (FIG. 4) at the output end and having a first rectangular waveguide section 254 at the other end which is an input end, with a transistion section 256 intermediate the square waveguide section 250 and the first rectangular waveguide section 254. The square waveguide section 250 also includes a second rectangular waveguide input section or side arm 260 which encompasses a rectangular coupling aperture (not shown) in the wall of the square waveguide 250 having its direction of elongation parallel to the longitudinal axis of the square waveguide section 250.

As well known in the art, an orthogonal mode transducer such as the transducer 50 will receive two energy modes which are orthogonal to each other and will couple the two modes of energy into a common transmission line. Thus, the electric vectors of the elevation and azimuth error signals of the waveforms 34 and 44 (FIG. 1) which are polarized normal to each other are passed into the rectangular waveguide sections 254 and 260 to be coupled with their electric vectors orthogonal to each other in the square waveguide section 250 as a combined error signal. An orthogonal mode transducer which may be utilized for the transducer 250 is described and claimed in an application "Orthogonal Mode Transducer" by Robert L. Fogel, Ser. No. 745,933 filed July 1, 1958, now U.S. Pat. No. 3,004,228, and assigned to the same assignee as this application. The orthogonally polarized combined error signal is passed from the square waveguide section 250 to a circular transition section 264.

The transducer 50 as well as the waveguides 40, 48 and 82 and other rectangular waveguides of the system of FIG. 1 may operate with the dominant $TE_{10}$ modes of microwave energy. For purposes of description, one of these dominant modes is that in which the electric vector is polarized in an up-down direction and the other is that in which the electric vector is polarized in a right-left direction. The circular sections of the modulator 49 such as the transition section 264, the half wave plate 54 and a transition section 300 may operate with the dominant $TE_{11}$ with one of the dominant modes being that in which the electric vector is polarized in the up-down direction and one of the dominant modes being that in which the electric vector is polarized in the right-left direction. It is to be noted that the dominant modes of the variable coupler 78 (FIG. 1) are similar, as discussed above.

The internal surface of the transition section 264 includes an impedance matching or reflection ring 268 which acts in response to energy transmitted from the square waveguide section 250 to reflect energy to thereby cancel reflection of energy resulting from the passing of energy from the square waveguide section 250 to the round transition section 264. As well known in the art the reflected energy from the two points when equal in magnitude and 180° out of phase from each other is cancelled. The orthogonally polarized combined signal is then passed into the phase shifter or half wave plate 54 which as will be explained in detail subsequently acts to rotate the planes of polarization of the orthogonally polarized electric vectors. The half wave plate 54 includes a first septum 272 and a second septum 274 fixed 180° apart in a rotating cylinder 276 which may include a circular gear track 280 around its outer surface. The rotating cylinder 276 may include in its construction several separate cylinders and rings for ease of assembly.

The septum 272, for example, includes a first reflection surface 282 and a second reflection surface 284 which have spacing and depth so that the energy waves reflected therefrom cancel each other or to provide impedance matching as described in relation to the transition section 264. Similarly, the other end of the septum 272 has reflection surfaces 286 and 288 to cause reflections caused by energy passing through these points to be cancelled. The rotating cylinder 276 rotates against suitable bearings such as ball bearing 290 enclosed in a suitable bearing cage which may include rings 292 and 294. The rotating cylinder 276 and the transition section such as 264 are maintained in a suitable stationary structure 295. The motor 58 may also be attached to the stationary structure 295. The motor 58 has a gear wheel 298 which is meshed with the gear track 280 for rotating the half wave plate 54 relative to the fixed transition section 264 at the input and the fixed transition section 300 at the output. As will be explained subsequently, the motor 58 provides a desired variable rotation rate to the half wave plate 54 for providing protection against undesired jamming signals received from the target. For example, the motor 58 may be a 400 cycle 2 phase motor which varies in rotation rate in response to variation of peak amplitude of a 400 cycle input signal (not shown).

The transition section 300 which is at the output end of the cylinder 276 includes a reflection or impedance matching ring 304 which acts similar to the reflection ring 268 of the transition section 264 to cancel undesired reflections.

Figure 4:
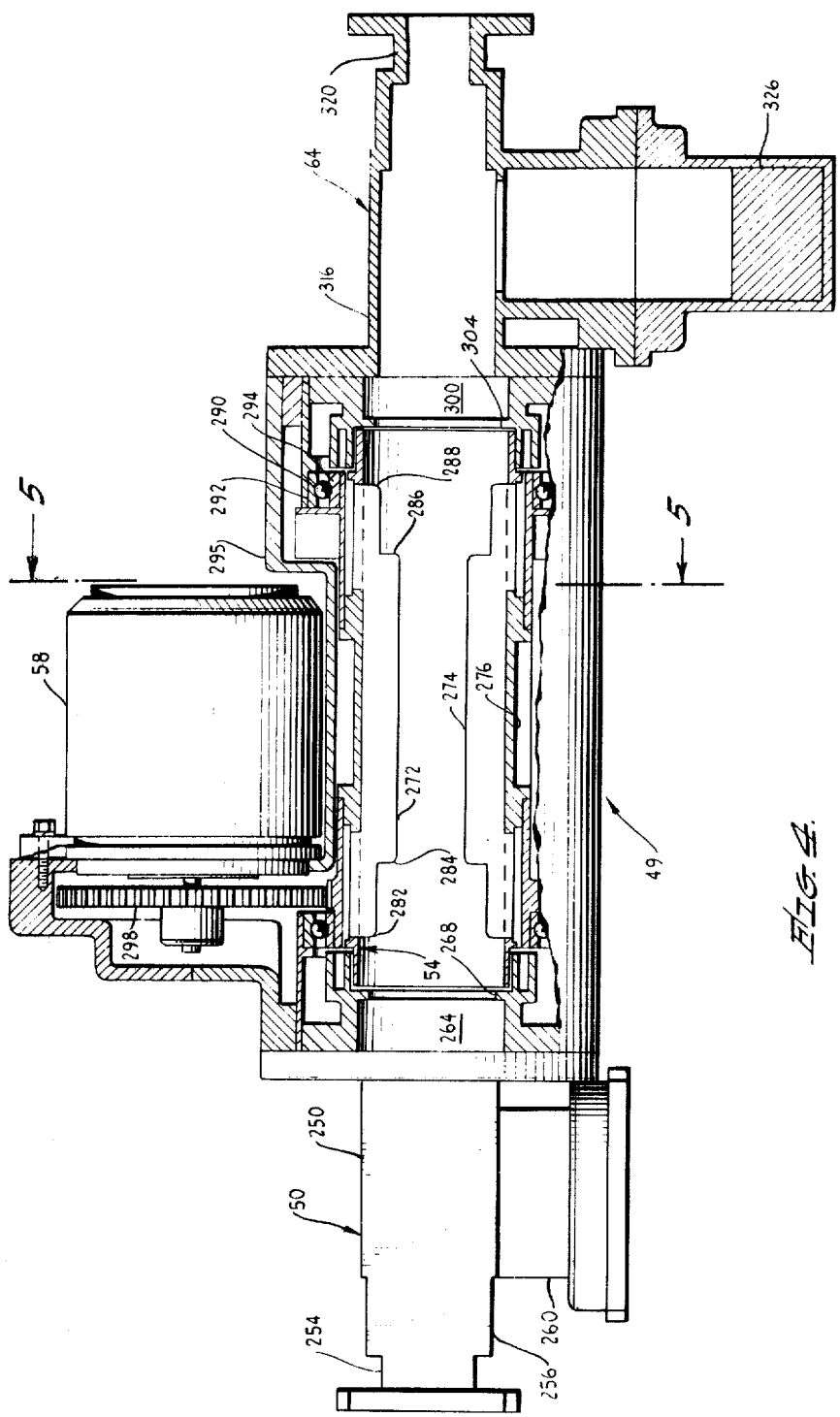
FIG. 4 is a partial sectional view of the detailed construction of the modulator of FIG. 1.
Figure 5:
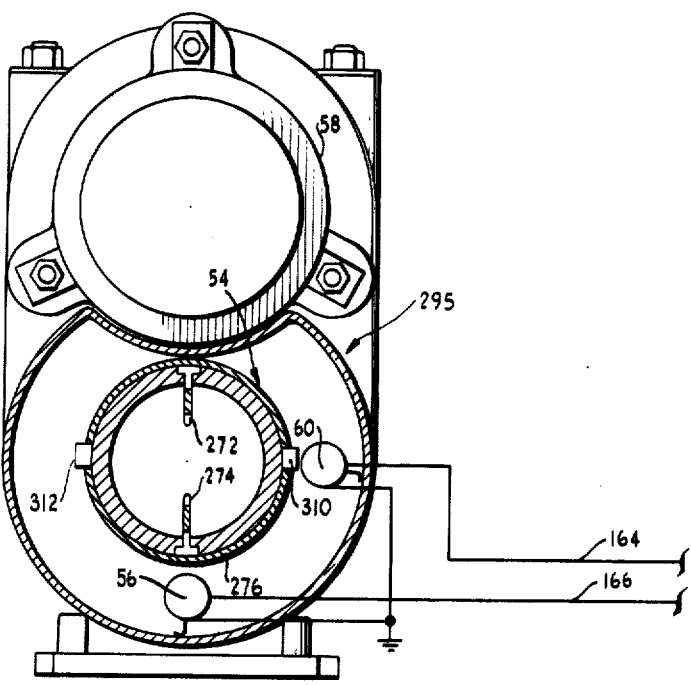
FIG. 5 is a cross sectional view of the modulator taken at sectional lines 5—5 of FIG. 4.

Referring temporarily to FIG. 5 which is a cross sectional view of the modulator of FIG. 4 taken at the lines 5—5, the construction of the modulator 49 will be explained in further detail. As discussed, the half wave plate 54 includes the rotating cylinder 276 with the septums 272 and 274 attached thereto. For providing reference signals indicative of the frequency of rotation of the half wave plate 54, the pip coils 56 and 60 are provided at a fixed position 90° apart from each other. Also, permanent magnets 310 and 312 are attached to the rotating cylinder 276 to pass a field through the pip coils during each rotation. One end of the pip coils 56 and 60 is connected to ground. The other end of the pip coil 60 is connected to a lead 164 and the other end of the pip coil 56 is connected to a lead 166. The development of the reference signals from the pip coils will be described in detail subsequently.

Referring now back to FIGS. 3 and 4, the rotated vectors developed in the half wave plate 54 are received in a square waveguide section 316 of a second orthogonal mode transducer 64. The transducer 64 is similar to the transducer 50 except the energy is received in the square waveguide section 316 and passed out of a first rectangular waveguide section 320. Also energy is passed out of a second rectangular waveguide section 322 where it is terminated by a suitable load 326. The rectangular waveguide section 320 is polarized for receiving electric vectors of energy in the right-left plane only.

It is to be noted at this time that the variable coupler 78 of FIG. 1 is similar in construction to the modulator 49 and will not be explained in detail. The variable coupler 78 differs in construction from that of the modulator 49 in that it does not utilize the pip coils 56 and 60 and the fixed magnets 310 and 312 and in that it does not utilize a continually rotating half wave plate and motor. The variable coupler 78 as will be explained subsequently operates at a fixed but variable angle of rotation of a cylinder similar to the cylinder 276, which angle is varied by a motor similar to a motor 58. The rotational position of the half wave plate 106 of the coupler 78 is controlled by the switching means 109 (FIG. 1) by acting to control the angle to which the motor 108 is rotated.

Reference may be now made to FIG. 1 and to FIG. 6, FIG. 6 being a graph showing time versus amplitude for illustrating the waveforms appearing in various positions of the radar system in accordance with FIG. 1. These Figures assist in understanding the action of the modulator 49 to modulate the amplitude of the azimuth and elevation error signals and to understand the relation of the modulator to the radar system. Also referring to FIGS. 7a and 7b, schematic diagrams looking toward the output end of the half wave plate 54 for illustrating the rotation of the electric vectors by the half wave plate are shown to clarify its operation.

Reviewing the system operation by first referring back to FIG. 1, a signal at radio frequency is transmitted from the transmitter 92 through the duplexer 86, and through the sum and difference network 28 where it is radiated from the antenna system 20 directed along the center axis 24 toward a target. As previously discussed, the principles of the radar system in accordance with this invention may be utilized either with pulse doppler type radar signals, continuous wave type radar signals or pulsed type radar signals. The detailed operation of the system of FIG. 1 will be explained as being utilized as a pulsed doppler type radar system, but it is to be expressly understood that the features of this invention are applicable to the above mentioned types of systems, for example. A pulsed doppler echo signal at radio frequency as shown by a waveform 330 is received by the monopulse feed 22 through apertures such as the aperture 23. The transmitted signal may be similar in appearance to the waveform 330 as shown in FIG. 6. The echo signal of the waveform 330 is then passed through the sum and difference network 28 where a sum signal, and elevation and azimuth difference signals are developed, as previously discussed. The sum signal shown by a waveform 90 is passed through the duplexer 86 to the waveguide 94 with its electric vectors polarized in the up-down plane, for example. The elevation error signal as shown by the waveform 34 is passed into a waveguide 40 with its electric vectors polarized in the up-down direction. The azimuth error signal which is similar to the waveform 34 and is shown as the waveform 44 on FIG. 1, is passed into a waveguide 48 with its electric vectors polarized in the right-left direction. The elevation error signal and the azimuth error signal are then passed into the orthogonal mode transducer 50 of the modulator 49.

Referring now also to FIG. 7a, for a further detailed description of the action of the modulator 49, the electric vector of the elevation error signal $E_E$ at the input of the phase shifter 54 as shown by the waveform 34 may be represented by a radial elevation vector $E_{E1}$ polarized in the up-down direction and the electric vector of the azimuth error signal $E_A$ at the input of the phase shifter 54 may be represented by a radial azimuth vector $E_{A1}$ polarized in the right-left direction or orthogonally to the electric vector $E_{E1}$. As discussed, the rotating cylinder 276 of the half wave plate or phase shifter 54 rotates the septums 272 and 274 continuously at a desired angular velocity. In FIG. 7a, the rotating cylinder 276 is shown when the electric elevation vector $E_{E1}$ is in a phase shifter plane 338, which is the plane through the septums 272 and 274. As is well known in the art, the action of a half wave plate is to shift a signal in the plane 338 of the phase shifter 180° with respect to a signal out of the plane 338 of the phase shifter. This phase shifting action causes the polarization of the output signal of the phase shifter section or the rotating cylinder 276 to rotate at twice the angular velocity of the mechanical angular velocity of the rotating cylinder. Specifically, when the rotating cylinder 276 is in the position as shown in FIG. 7a, or in the inverted position, the electric elevation vector $E_{E1}$ is shifted in phase 180° to appear at the output of the phase shifter 54 as the electric vector $E_{E2}$. The electric azimuth vector $E_{A1}$ has no component in the phase shifter plane 338 and is passed out of the phase shifter 54 as the electric vector $E_{A2}$ without rotation.

Referring now to FIG. 7b, it will be assumed that the continually rotating phase shifter plane 338 of the rotating cylinder 276 has rotated 22½° from its position of FIG. 7a, in order to further explain the rotation of the planes of the elevation and azimuth vectors. The electric elevation vector $E_{E1}$ at the input consists of two components, one component 344 being parallel to the phase shifter plane 338 and the other 350 being normal to the phase shifter plane 338. The component 344 in the phase shifter plane 338 is shifted in phase 180° to give the output component 348. The non-shifted component 350 of the elevation vector $E_{E1}$ at right angles to the phase shifter plane 338 is combined with the shifted component 348 to give the sum rotated electric elevation vector $E_{E2}$ at the output of the phase shifter 54.

In like manner, it may be seen from FIG. 7b that the input electric azimuth vector $E_{A1}$ is also reduced to a component 354 in the phase shifter plane 338 and to a component 356 out of or at right angles to the phase shifter plane 338. The in phase azimuth component 354 is shifted 180° in phase to give the output component 358 which when combined with the unshifted component vector 356 gives a resultant electric azimuth vector $E_{A2}$ at the output of the phase shifter 54. Thus, it can be seen that in passing through the phase shifter 54 which has been rotated 22½°, the elevation vector $E_{E1}$ has been shifted in phase 180° and then rotated 45° and the azimuth vector $E_{A1}$ has been rotated 45°. Thus, as the phase shifter plane 338 rotates, the planes of the elevation and azimuth vectors $E_{E1}$ and $E_{A1}$ rotate at twice the angular velocity of the rotating cylinder 276.

Only the components 362 and 364 of the rotated electric vectors $E_{E2}$ and $E_{A2}$ are to be received as outputs at the plane of acceptance 368 of a polarization direction sensitive element which accepts components polarized in the right-left direction at the output of the transducer 64. The component accepted from the vector $E_{A2}$ is a function of the cosine of the angle $\theta$, while the component 362 accepted from the vector $E_{F2}$ is a function of the cos of (90°− $\theta$) or sin $\theta$. The accepted components from the rotated vectors are therefore a function of the cosine of the angle between the rotated vector and the plane of acceptance.

The 22½° rotated position shown is only one position of the rotating plane 338 as it continually rotates to carry out its phase shifting action. As the plane 338 rotates, components 362 and 364 of the rotating output electric vectors $E_{A2}$ and $E_{F2}$ in the plane of acceptance 368 are varying in amplitude. The components 362 and 364 at the plane of acceptance 368 represent an elevation and an azimuth error signal which is amplitude modulated as the plane 338 rotates. The varying components 362 and 364 combine in the plane of acceptance 368 to form a combined error signal which is also amplitude modulated. It is also to be noted that components accepted by the plane of acceptance 368 are cosine components of the angle $\theta$ but a plane of acceptance in an up-down direction as provided by the rectangular section of the transducer 112 connected to the load 116 (FIG. 1), accepts sine components of the angle $\theta$. Note that in the 22½° rotated position shown for the rotating plane 338 of the phase shifter and when the electric vectors $E_{E1}$ and $E_{A1}$ are of equal amplitude, the vectors 362 and 364 after being passed through the plane of acceptance 368 of the transducer 64 will cancel to give a null point to the combined modulated error signal derived from the modulator. It is to also be noted that the elevation and azimuth electric vectors $E_{E1}$ and $E_{A1}$ are modulated at a frequency of twice the angular velocity of the rotating cylinder 276 to give the components such as 362 and 364 which represent the modulated elevation and azimuth error signals. The amplitude modulated elevation and azimuth error signals have envelopes which are developed 90° out of phase from each other.

Reference is made now to FIG. 8, which is a diagram showing time versus amplitude of the signals developed by the modulator 49. The modulator half wave plate or phase shifter 54 is shown in diagram 8 (b) at various positions of rotation at times $t_1$ through $t_6$. The modulator 49 acts to develop a double sideband suppressed carrier signal since as noted in FIG. 7b, only the components of the rotated electric vectors which are a function of the angle between the rotated vector and the plane of acceptance are accepted by the plane of acceptance 368. However, this carrier suppression action will be explained in detail subsequently and at present the modulation of the radio frequency signals will be discussed. For purposes of explanation the polarized elevation input vector $E_{E1}$ is shown in diagram 8(c) having a constant amplitude at times $t_1$ through $t_6$ indicating that during this time period, the target is at a constant angle relative to the axis 24 of the antenna system 20. At time $t_1$, the elevation vector $E_{E1}$ which is in the phase shifter plane 338 is rotated 180 degrees tp give a vector $E_{F3}$ as shown by a vector component 372 of a diagram 8(d) at the output of the modulator 49. Thus, at time $t_1$, the modulated elevation error signal as shown by the waveform 366 of a diagram 8(a) has a null point since the vector 372 is out or at right angles to the plane of acceptance 368 at the output of the modulated 49.

At time $t_2$, the phase shifter plane 338 has rotated 22½° from its position at time $t_1$ and the input vector $E_{E1}$ is rotated to pass an output vector $E_{F3}$ as shown by the vector component 374 through the plane of acceptance 368. At time $t_3$ the phase shifter plane 338 has rotated 45° and the input vector $E_{E1}$ is rotated to pass the output vector $E_{E3}$ as shown by vector component 378 into the plane of acceptance 368. The vector component 378 has a similar amplitude to the input vector $E_{E1}$, thus providing the peak amplitude to the modulated elevation error signal of the waveform 366.

At time $t_4$, the phase shifter plane 338 has been rotated 90° and the elevation input vector $E_{E1}$ is passed through the phase shifter without rotation to provide the output vector $E_{E3}$ as shown by a vector component 380 at the output end of the phase shifter. Because the vector component 380 at time $t_4$ is not in the plane of acceptance 368, a second null point is provided to the modulated elevation error signal of the waveform 366. At time $t_5$ the plane 338 of the phase shifter has rotated 135 mechanical degrees and the elevation input vector $E_{E1}$ is rotated to develop the output vector $E_{E3}$ as shown by a vector component 384 which is equal in amplitude to the vector $E_{E1}$ and is parallel with the plane of acceptance 368, thus providing a second peak amplitude for the modulated elevation error signal of the waveform 366. Also, at time $t_6$ the plane 338 of the phase shifter has rotated 180° and the elevation input vector $E_{E1}$ is rotated 180° to form the output vector $E_{E3}$ as shown by the vector component 388, which component is not accepted by the plane 368, thus providing a third null point in the elevation error signal of the waveform 366.

Therefore, it can be seen by the envelope of the waveform 366 that as the rotating cylinder 276 is rotated through 180 mechanical degrees the elevation error signal of the waveform 366 is amplitude modulated through 360 electrical degrees. Thus the electrical frequency modulation is twice the mechanical frequency of rotation of the phase shifter 54.

Having considered the modulated elevation error signal separately, the modulated azimuth error signal as shown by the waveform 392 of a diagram 8(e) at the output waveguide section of the modulator 49 may be considered in like manner. For purposes of explanation, the polarized azimuth input vector $E_{A1}$ of a diagram 8(f) is shown polarized in the right-left direction having equal amplitudes between times $t_1$ and $t_6$, and with the amplitudes being equal to that of the elevation vector $E_{E1}$. At time $t_1$, the azimuth vector $E_{A1}$ is passed through the phase shifter 54 without rotation to form an output vector $E_{A3}$ as shown by a vector component 396 which is parallel to and passed through the plane of acceptance 368. Thus, at time $t_1$ the modulated azimuth error signal of the waveform 392 has a peak amplitude. At time $t_2$, the phase shifter plane 338 has rotated 22½ mechanical degrees to develop the vector $E_{A3}$ as shown by a vector component 400 in the plane of acceptance 368. It is to be noted at present that the vector 400 is equal in amplitude but opposite in phase to the vector component 374 derived from the elevation vector $E_{E1}$.

At time $t_3$, the phase shifter 54 is rotated 45° to develop the output vector $E_{A3}$ as shown by a vector component 404 at right angles to the plane of acceptance 368, thus providing a null point in the modulated azimuth error signal of the waveform 392. At time $t_4$ the output vector $E_{A3}$ as shown by a vector component 406 is derived from the azimuth error vector $E_{A1}$, having an amplitude equal to the azimuth vector $E_{A1}$, thus providing a peak amplitude in the azimuth error signal of the waveform 392. At time $t_5$, the output vector $E_{A3}$ as shown by a vector component 408 is developed at right angles to the plane of acceptance 368 resulting in a null point in the modulated azimuth error signal of the waveform 392. At time $t_6$, the output vector $E_{A3}$ as shown by a vector 410 is equal in amplitude to the input vector $E_{A1}$ and the azimuth error signal of the waveform 392 has a peak amplitude. Thus the elevation input vector $E_{E1}$ and the azimuth vector $E_{A1}$ are rotated in the phase shifter 54 to develop the amplitude modulated elevation and azimuth error signals $E_{EM}$ and $E_{AM}$ of the waveforms 366 and 392 having their modulation envelopes 90° out of phase phase from each other. This phase difference is utilized for signal separation in the detecting system.

Heretofore, the elevation and azimuth error signals $E_{EM}$ and $E_{AM}$ of the waveforms 366 and 392 have been considered separately. A combined error signal $E_M$ of the waveform 70 of a diagram 8($g$) is however developed from the two signals at the plane of acceptance 368 in response to both an elevation and azimuth directional error. At time $t_1$, only the vector component 396 is in the plane 368 and a combined vector signal $E_{R3}$ is developed as shown by a vector component 414 which is equal in amplitude thereto. At time $t_2$, the vector component 374 and 400 cancel each other to form a null point in the combined error signal of the waveform 70. At time $t_3$ the combined vector $E_{R3}$ as shown by the vector component 416 is equal in amplitude to the elevation vector component 378 in the plane of acceptance 368. At time $t_4$, the combined vector $E_{R3}$, as shown by vector 420, is equal in amplitude to the vector component 406 of the azimuth vector $E_{A3}$ in the plane of acceptance 368. At time $t_5$, the combined vector $E_{R3}$, as shown by a vector 422 in the plane of acceptance 368, is equal in amplitude to the vector component 384 of the elevation vector $E_{E3}$ and at time $t_6$ the resultant vector $E_{R3}$ as shown by a vector arrow 426 is equal in amplitude to the vector component 410 of the azimuth vector $E_{A3}$ in the plane of acceptance 368. Thus it can be seen that the combined error signal $E_M$ of the waveform 70 has a phase difference $\phi$ in relation to the modulated azimuth error signal of the waveform 392. Since in this illustration the elevation and azimuth input vector $E_{E1}$ and $E_{A1}$ are equal in amplitude, the phase difference $\phi$ is an angle of 45°, but this phase difference varies as the relative amplitude of the elevation azimuth input vectors $E_{E1}$ and $E_{A1}$ change. The angle $\phi$ and an amplitude $E_R$ which is the peak amplitude of the combined error signal of the waveform 70 give an indication respectively of the direction of error and of the amplitude of the directional error of the target from the axis 24 of the antenna system 20.

Now that the general modulation action of the half wave plate has been explained its operation to convert the radio frequency carrier waves of the elevation and azimuth input vectors $E_{E1}$ and $E_{A1}$ into a double sideband suppressed carrier signal will be explained in more detail by referring back to FIG. 6. The modulated elevation error signal of the waveform 366 includes a radio frequency signal having the conventional form of a double sideband signal since there is a phase shift at the null points of the modulation. An equation for the double sideband suppressed carrier signal derived from the modulator 49 may be:

$$E_{AM} = E_A \cos(\omega_c t) \cos \theta t$$

where $E_{AM}$ = the azimuth error signal at the output of the modulator 49

$E_A$ = the peak amplitude of the azimuth error signal which is equal to the azimuth vector $E_{A1}$ $\omega_c$ = angular frequency of the RF carrier wave in radians/sec $\theta = 2\omega_s$ in radians/sec $\omega_s$ = angular frequency of rotation of the phase shifter or half wave plate 54 in radians/sec.

Since the equation does not include a separate expression of the carrier wave $\cos(\omega_c t)$, it can be readily seen that the signal $E_{AM}$ does not include the carrier wave $\omega_c$. As may be recalled by referring temporarily to FIGS. 7a and 7b, only the elevation and azimuth components proportional to the cosine of the angle between the rotated vectors and the plane of acceptance 368 are received in the plane of acceptance 368 at the output of the transducer 64. Thus a double sideband suppressed carrier signal is developed by the modulator 49 from the carrier input waves.

The modulated azimuth signal at the output of the modulator 49 may also be expressed as:

$$E_{AM} = \frac{E_A}{2} \left\{ \cos(\omega_c - \theta)t + \cos(\omega_c + \theta)t \right\}.$$

The modulated elevation signal at the output of the modulator 49 may be expressed as:

$$E_{EM} = E_E \cos(\omega_c t) \cos\left(\theta t + \frac{\pi}{2}\right) \text{ or}$$

$$E_{EM} = \frac{E_E}{2} \left\{ \cos\left[(\omega_c - \theta)t - \frac{\pi}{2}\right] + \cos\left[(\omega_c + \omega_s)t + \frac{\pi}{2}\right] \right\}$$

where $E_{EM}$ = the modulated elevation error signal derived from the modulator 49.

$E_E$ = peak amplitude of the elevation error signal which is equal in magnitude to the vector $E_{E1}$.

Referring again to FIG. 7b, it may be readily seen that the sine component of the angle $\theta$ is the modulation component accepted by the plane of acceptance since in the equation above $\sin \theta t$ is equal in magnitude to $\cos(\theta t + \pi/2)$. Combining the equations for the azimuth and elevation error signals gives:

$$E_M = \sqrt{E_A^2 + E_E^2} \left\{ \cos(\omega_c t) \cos(\theta t + \phi) \right\}$$

where $E_M$ = the combined error signal derived from the modulator 49 as shown by the waveform 70 of FIG. 8.

$\phi = \tan^{-1} E_E/E_A$ which is the phase angle as shown in FIG. 8. $\phi$ is the number of angular degrees which the phase of the combined modulated error signal leads or lags the modulated azimuth error signal $E_{AM}$ and as discussed, indicates direction of the target relative to the axis 24 of the antenna 20.

The peak magnitude of the combined error signal indicating magnitude of the directional error is $\sqrt{E_A^2 + E_E^2}$ which may be expressed as $E_R$ and is shown in FIG. 8. Thus it can be seen by the representative equations that the signals $E_{AM}$, $E_{EM}$ and $E_M$ are suppressed carrier double sideband signals.

For further clarity of explanation, and referring to FIG. 6, the action of the modulator is shown as a conventional vector representation of the continually rotating sideband frequency vectors which develop the modulated elevation and azimuth signals of the waveforms 366 and 392. The vectors of the vector diagram 428 are 180° out of phase with the rotating vectors of the vector diagram 430. Thus, since the vectors of the diagrams 428 and 430 rotate continuously at a common angular velocity $2\omega_R$, the elevation and azimuth error signals of the waveforms 366 and 392 are developed along the time axis, modulated 90° out of phase from each other. The variable modulation rate of the modulator 49 may be explained by referring to FIG. 1 and also to FIG. 9, which is a diagram showing frequency versus amplitude of signals in various positions of the radar system in accordance with this invention. The error signals derived at radio frequency from the sum and difference network 28 as well as the sum signal are represented by a diagram 434 which shows a signal 438 at a frequency of $\omega_c/2\pi$. The combined error signal at the output of the modulator 49 is shown by a diagram 442 having double sideband signals 446 and 448, each including the modulated combined error signal of the waveform 70 (FIG. 8). The sideband signals 446 and 448 are each separated from the carrier frequency $\omega_c/2\pi$ by a frequency difference of $2\omega_R/2\pi$ or $\omega_R/\pi$ so that the frequency separation of the modulated sidebands vary with the angular frequency $\omega_s$ of the rotating cylinder 276 or half wave plate 54. An interfering signal received by the antenna system 20 must be received substantially at a frequency difference of $\omega_R/\pi$ from the carrier frequency in order to interfere with the amplitude of the error signals and thus interfere with the directional information received from the antenna system 70. Therefore in order to overcome interfering jamming signals the angular velocity $\omega_R$ of the half wave plate 106 is varied by varying the speed of the motor 58 by the switching means 59. The spectral position of the sideband signals 446 and 448 may vary in a continuous pattern or randomly depending upon the characteristics of the switching means 59. Since the phase sensitive detectors 152 and 156 act to respond only to signals at the frequency of the reference signal which is representative of the frequency $\omega_R$, undesired jamming signals not having a similar frequency to the sideband signals 446 and 448 do not affect the detected error signal.

Bearing the action of the modulator 49 for developing a double sideband suppressed carrier signal as shown by the diagram 442 in mind, the operation of coupling the sideband signals with the sum signal to form a common signal in the variable coupler 78 may be understood. As discussed in relation to the radar system of FIG. 1, the common signal is then amplified in a single amplifier and detected to derive DC error signals. The variable coupler 78 combines the double sideband signals of the diagram 442 of FIG. 9 with the sum signal as the carrier wave which appears similar to the signal 438 of the diagram 434 to develop a common signal as shown by a diagram 452. Since the coupler 78 does not utilize a continuously rotating section, it provides variable coupling of the signals rather than the modulation action of the modulator 49.

As previously discussed, the variable coupler 78 is structurally similar to the modulator 49. Therefore, the action of the coupler may be understood by referring to FIGS. 3 and 4 which show the modulator 49 and by referring to the system diagram of FIG. 1. The combined error signal of the waveform 70 which has its electric vector polarized in the right-left direction in the waveguide 74, is passed into a rectangular waveguide section of the transducer 102, which section is similar to section 254 of the transducer 50. The sum signal of the waveform 90 which has its electric vector polarized in the up-down direction is passed through the waveguide 94 to a rectangular waveguide section of the transducer 102 which is similar to the rectangular waveguide section 260 of the transducer 50. The electric vectors of the modulated combined error signal of the waveform 70 (FIG. 8) and the sum signal of the waveform 90 are coupled together in orthogonally polarized planes in the transducer 102 and passed through the half wave plate or phase shifter 106, where the planes of polarization are rotated through a desired angle. The rotated vectors are then passed through the transducer 112 where components which are a function of the cosine of the angle between the vectors and a plane of acceptance are accepted which are polarized in the right-left plane corresponding to the dominant mode of a rectangular waveguide section similar to the section 320 of the transducer 64.

Referring now to FIG. 6, the sum and the modulated elevation error signal may be combined in the coupler 78 to form a common signal as shown by a waveform 460 and the sum and the modulated azimuth error signal may be combined in the coupler 78 to form a common signal as shown by a waveform 462. Although there may be both elevation and azimuth error signals present, the common signal including the elevation and the sum signal or the azimuth and the sum signals are shown for purposes of illustration. The common signals of the waveforms 460 and 462 represent, respectively, echo signals received with directional errors only in the elevation or in the azimuth direction. It is to be noted that the common signals of the waveforms 460 and 462 are drawn out of scale since the sum signal may have a greater amplitude than the modulated error signal. When an elevation and azimuth error signal are both present the combined error signal of the waveform 70 and the sum signal of the waveform 476 combine to form a common signal 120 (FIG. 1) which includes the sum signal and the combined error signal. As has been discussed in relation to the detection of the signals, the sum signal is utilized as a reference signal.

For clarity, a conventional vector representation of the carrier and sideband signals is shown by a diagram 466 for illustrating the development of the common signal of the waveform 460 from the sum and the modulated elevation error sideband signals. Also for clarity a vector representation of the sum signal and the modulated azimuth error sideband signal is shown by a diagram 468 to illustrate the development of the common signal of the waveform 462.

Figure 10:
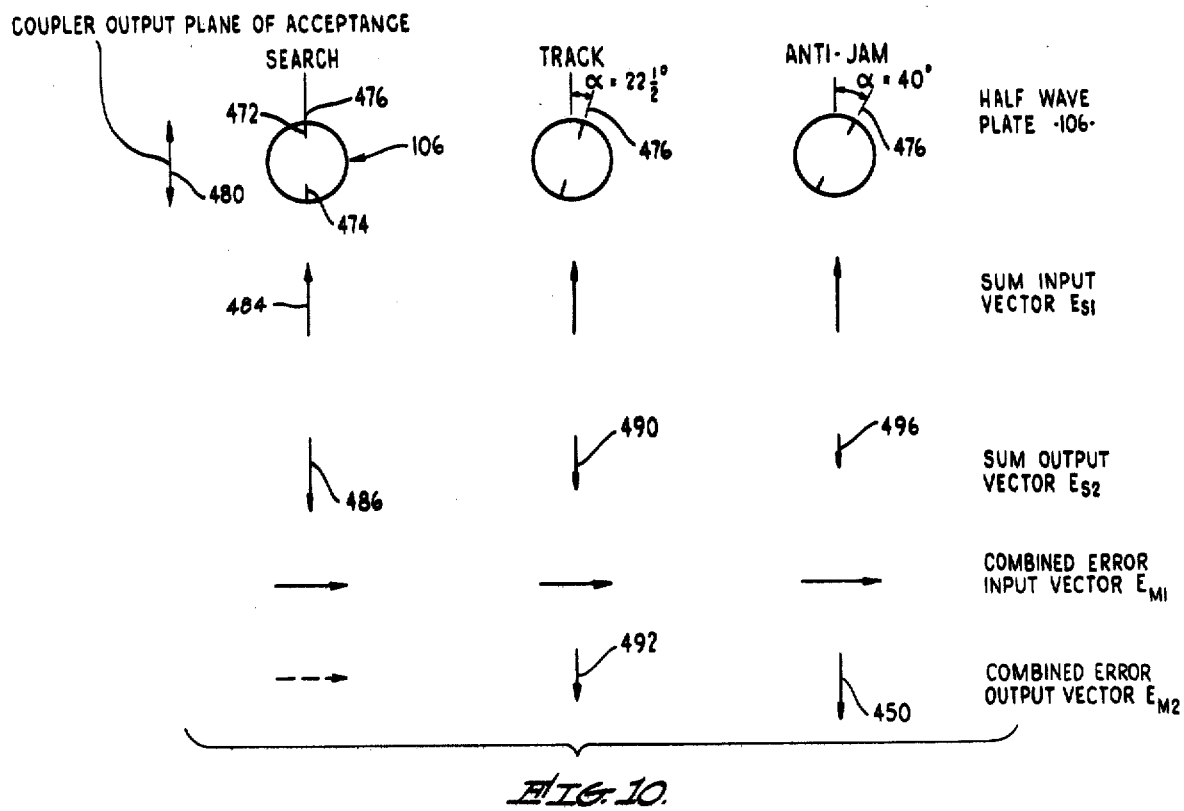
FIG. 10 is a schematic diagram of vector arrows for explaining the operation of the coupler of FIG. 1.

Referring now also to FIG. 10 which is a schematic vector diagram showing the operation of the variable coupler 78, the variable coupling action for developing the common signal of the waveform 120, for example, will be explained. As previously discussed, the variable coupler 78 provides a variation of the energy coupling ratio of the sum signal and the modulated error signals for different conditions of system operation. During antenna search when the system is searching for a target, as is well known in the art, the coupling ratio may be set so that the sum signal is completely coupled, that is its amplitude is not reduced, and the error signal is completely uncoupled, that is, no error signal is passed out of the variable coupler 78. During tracking operation when no directional information is desired, the two signals may be equally coupled in the coupler 78 and the sum and the error signals may have equal amplitude in the combined signal. During special tracking conditions the sensitivity of the system may be increased by coupling the modulated error signals to the output more strongly than the sum signal, that is, the error signal is passed into the output plane with a greater amplitude than that of the sum signal.

The half wave plate or phase shifter 106 (FIGS. 1 and 10) includes a septum 472 and a septum 474 arranged in a cylinder similar to the cylinder 276. The half wave plate 106 is shown diagramatically in FIG. 10 looking toward the output end of the transducer 112. The operation of the half wave plate 106 is similar to the half wave plate 54 of the modulator 49 (FIGS. 3 and 4), acting to shift a signal component in the plane of the phase shifter 180° with respect to a signal component out of the plane of the phase shifter. This action causes the amplitude of the up-down and right-left vectors coupled into the common signal to vary with the angle of the phase shifter. During search operation, the phase shifter plane 476 is maintained parallel to a sum input vector $E_{s1}$ which is also parallel to a plane of acceptance 480 as determined by the polarized rectangular waveguide section of the transducer 112. The sum input vector $E_{s1}$ as shown by the vector component 484 is phase shifted 180 mechanical degrees and passed into the plane of acceptance 480 as a sum output vector $E_{s2}$ shown by a vector component 486 having an amplitude equal to the sum input vector $E_{s1}$. Also during search a combined error vector $E_{m1}$ is oriented out of the plane of acceptance 480 and no components of the error signals are passed through the variable coupler 78.

During tracking operation the phase shifter plane 476 may be rotated to a position 22½ mechanical degrees from the plane of acceptance 480 so that the component of the sum input vector $E_{s1}$ accepted by the plane of acceptance 480 is reduced in amplitude as shown by the vector component 490 of the sum output vector $E_{s2}$. Also during tracking operation, the vector of the combined error signal $E_{m1}$ polarized right-left is rotated so that the component accepted by the plane 480 is reduced in amplitude to provide the output vector $E_{m2}$ as shown by the vector component 492.

During special radar tracking conditions such as anti-jam operation where it may be desired to decrease the relative amplitude of the sideband signals, the phase shifter plane 476 may be set at an angle of 40° relative to the plane of acceptance 480 so that the component of the sum input vector $E_{s1}$ accepted by the plane 480 is greatly reduced in amplitude as shown by the sum output vector $E_{s2}$ indicated by the vector arrow 496. Also during anti-jam operation, the vector of the combined error signal $E_{m1}$ which is polarized right-left is rotated so that its component accepted by the plane 480 has an amplitude substantially equal to the combined vector $E_{m1}$ as shown by the vector component 450. Thus, it can be seen that by simply varying the angular position of the half wave plate 106, desired coupling ratios may be obtained to provide improved radar performance.

The common signal of the waveform 120 (FIG. 1) at the output waveguide of the coupler 78 may be expressed as $$E_{oc} = E_{so} \cos\rho + E_m \sin\rho$$

where
$E_{oc}$ = the common signal developed by the coupler
$E_{so} = E_s \cos(\omega_c t)$ which is the sum signal as shown in FIG. 6 where
$E_s$ is the peak magnitude
$E_m$ = the combined error signal derived from the modulator 49 as shown by the waveform 70 of FIG. 8.
$\rho = 2\alpha$ where $\alpha$ is the selected mechanical angle as determined by the motor 108, which is the angle of the plane of the phase shifter 476 relative to the output plane of acceptance 480. It may be seen by referring to FIG. 10 and by recalling the explanation in reference to FIGS. 7a and 7b that since the sum signal is polarized in the up-down direction, the cosine component of the vector rotation angle $\rho$ angle is accepted by the plane of acceptance 480. It also may be readily seen that since the modulated error vector $E_m$ is polarized right-left, the sine component of the vector rotation angle $\rho$ is accepted by the plane of acceptance 480.

The IF amplification and the detection operation will now be explained in detail, referring back to FIG. 1. The mixer 126 heterodynes the common signal 120 to a common signal (not shown) at intermediate frequency. The IF amplifier 132 acts to amplify the IF common signal in a single amplifier to eliminate the conventional phase and amplitude balancing problem of a plurality of parallel amplifiers as previously described. The speed gate 136 then acts in the conventional manner to shift the common signal in frequency so as to pass it through a narrow band filter for eliminating undesired clutter signals, for example. The envelope detector 140 then shifts the carrier wave of the IF signal to develop a DC signal as shown by a signal 454 of a diagram 453 in FIG. 9. The modulation signal as shown by the sideband signal 456 thus has a modulation at an actual frequency which is equal to $2\omega s/2\rho$. In the conventional manner, the signal of the diagram 453 is passed through a low pass filter 142 which may have a filter pass band 460 to remove the modulation component. The DC signal 454 is then passed through the automatic gain control circuit 146 which develops the signal to be passed to the IF amplifier 132 for normalizing its amplification. Thus, the sum signal is utilized as a referenced signal.

The detected sideband error signal as shown by a waveform 150 in FIG. 1 is applied to the phase sensitive detectors 152 and 156. The reference signals on the leads 190 and 192 which are 90 degrees out of phase from each other are similar in appearance to the waveform 180 and act in a conventional manner to separate the azimuth and elevation error components so as to develop DC signals on the output leads 194 and 196.

Figure 11:
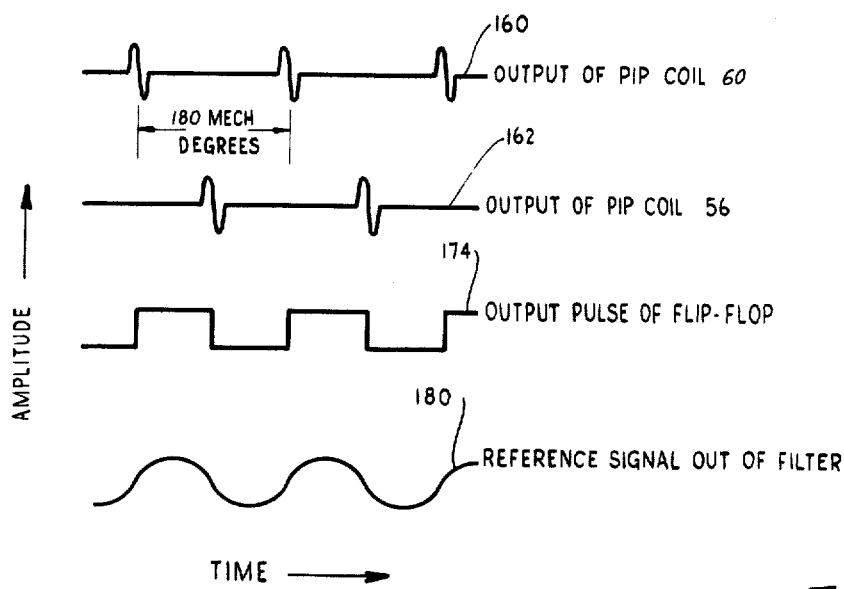
FIG. 11 is a diagram of time versus amplitude showing waveforms for explaining the development of the reference signals of FIG. 1.

The development of the reference signals may be understood with reference to FIG. 11, which is a diagram of the reference signals showing time vs. amplitude. As may be seen in FIG. 5 the pip coils 56 and 60 are arranged 90 angular degrees from each other around the rotating cylinder 276. The pip signals developed by the pip coils 56 and 60 in response to the fields of the magnets 310 and 312 passing therethrough are shown by waveforms 160 and 162, the pip signals in each waveform being developed 180 mechanical degrees of rotation apart.

As previously discussed, the pip signals of the waveform 160 are developed from the pip coil 56 and the pip signals of the waveform 162 are developed from the pip coil 56. The signal of the waveforms 160 and 162 pass to opposite inputs of the flip flop 170 to alternately trigger it to its opposite states. Thus, output pulses of the waveform 174 are developed by changing its voltage level every 90 mechanical degrees of rotation of the half wave plate 54. Pulses of the waveform 174 are passed through the filter 176 to develop the sinusoidal reference signal of the waveform 180. The reference signals of the waveform 180 have a frequency which is twice the angular velocity $\omega_s$ of the half wave plate 54 or $2\omega_s$ to correspond to the modulation frequency of the error signals. The reference signal of the waveform 180 is then simultaneously shifted in phase 90° in the phase shifter 184 and is passed through the phase shifter 186. The phase shifters 184 and 186 also act to balance the amplitude of the reference signals (not shown) on the leads 190 and 192.

Figure 12:
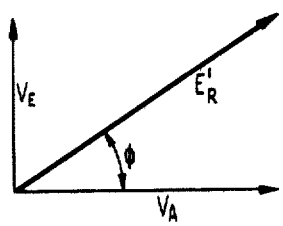
FIG. 12 is a vector diagram for explaining the operation of the detecting system of FIG. 1.

Referring now to FIG. 12, a vector diagram is shown for explaining the operation of the detection operation of the error signals. The modulated signal derived from the envelope detector 140 may be represented as:

$$E_d = E'_R \cos(\theta t + \phi)$$

where $E_d$ represents the modulated envelope signal derived from the detector 140.

$E'_R$ is a peak amplitude error signal and is equal to $\sqrt{E_A{}^2 + E_E{}^2}$ times the amplification of the IF amplifier 132.

$\phi$ is the phase angle between the azimuth and error signals as shown on FIG. 8, which angle indicates the direction of the target directional error.

The azimuth and elevation reference signals derived from the pip coils 56 and 60 may be expressed as follows:

$$E_{AZ} = E_o \sin(\theta t)$$

$$E_{EL} = E_o \cos(\theta t)$$

where $E_o$ = peak amplitude of the reference signals
$\theta = 2\omega_s$.

It is to be again noted that the frequency of the azimuth and elevation reference signals vary with changes of angular velocity of the half wave plate 54 consistent with the frequency variation of the sideband error signals when modulating at variable frequency to overcome jamming signals, so as to provide detection at only the desired sideband frequency.

The phase sensitive detectors 152 and 156 are conventional circuits and will not be explained in detail. The detectors 152 and 156 respond to the detected modulation signal $E_d$ and the azimuth elevation reference signals to develop DC components which may be expressed as follows:

$$V_A = E_o E'_R \cos\phi.$$

$$V_E = E_o E'_R \sin\phi.$$

where $V_A$ = a DC signal indicative of the magnitude of the azimuth directional error.

$V_E$ = a DC signal indicative of the magnitude of the elevation directional error.

The diagram of FIG. 12 indicates the peak amplitude $E'_R$ of the combined error signal and the phase angle $\phi$ which both control the amplitude of the azimuth and elevation error signals $V_A$ and $V_E$. Thus the DC error signals $V_E$ and $V_A$ are passed to control circuitry such as an angle servo circuit (not shown). Because of the utilization of a single IF amplifier 132 the DC signals $V_E$ and $V_A$ after being referenced by the sum signal in the IF amplifier 132 indicate the error derived from the antenna system 20 with a high degree of accuracy and reliability.

The detection system of FIG. 2 which may be utilized with a pulsed type radar system in accordance with this invention acts in a similar manner to develop DC error signals on the output leads 240 and 242. Since this detection system including the box car detector circuit 214 is well known to one skilled in the art, it will not be explained in further detail.

Therefore, a radar system in accordance with this invention has been described which transmits and receives signals without modulation external to the system. The received error signals are modulated on reception at radio frequency to provide a common signal for utilizing a common amplifier so as to increase the accuracy of the directional information. By developing the common signal at radio frequency, a simplified and highly reliable system is provided. The modulator operating at radio frequency provides an improved means to provide protection against jamming signals, for example. The variable coupler acts in an improved manner to provide a variable coupling ratio for the error and the reference signal thus allowing improved system performance during different types of radar operation.

What is claimed is:

1. A radar system for receiving unmodulated directional echo signals at radio frequency from a source comprising antenna means for developing from the echo signals at radio frequency a sum signal, an elevation error signal and an azimuth error signal each of the error signals being linearly polarized and having a voltage amplitude indicative of the direction of said source from an axis of said antenna, means responsive to the error signals for coupling the error signals in a common conductor with their planes of linear polarization orthogonal to each other, modulating means for simultaneously rotating the linearly polarized planes of said elevation and azimuth error signals at a desired angular velocity, polarization direction sensitive means for accepting a component of said elevation and azimuth error signal in a given direction of polarization to develop a resultant signal including amplitude modulated elevation and azimuth error signals modulated to develop a difference in phase and arranged spectrally as double sideband signals, coupling means coupled to said polarization direction sensitive means and to said antenna means for combining the resultant error signal and the sum signal at radio frequency into a common signal having the sum signal arranged as the carrier wave to the double sideband signals, mixing means for heterodyning the common signal to intermediate frequency, amplifier means coupled to said mixing means for amplifying the intermediate frequency common signal, means coupled to said modulating means for developing a reference signal indicative of the angular velocity, provided by the modulating means and detecting means coupled to receive the reference signal and coupled to said amplifier means to respond to the amplitude of the common signal for developing output signals having characteristics indicative of the direction of said source from said antenna means.

2. A radar lobing system comprising antenna means for developing, from echo signals intercepted from a target, a sum signal, elevation signal, and azimuth signal, all at microwave frequency, the elevation and azimuth signals having relative voltage amplitudes indicative of the direction of said target, a modulator connected for amplitude modulating the elevation and azimuth signals in space quadrature relative to each other at a desired modulation frequency and including means for developing a reference signal having a frequency proportional to said modulation frequency, a coupler connected for combining the sum signal and the modulated signals into a common signal at microwave frequency, mixing means for heterodyning the common signal to an intermediate frequency signal, and detecting means coupled to respond to the reference signal of said modulator and coupled to receive the intermediate frequency signal for separating components of the sum, elevation and azimuth signals therefrom having characteristics indicative of the range and direction of said target.

3. A radar system for developing a common signal at radio frequency to be passed through a common amplifier from first, second and third unmodulated carrier signals at radio frequency with said common signal including said first and second signals modulated and combined with said third signal as the carrier wave, comprising means for coupling said first and second signals in orthogonal planes, means for rotating the planes of orthogonality at a desired angular velocity, a polarization direction sensitive element for receiving components of the first and second signals in a given plane to develop a modulated signal including the first and second signals modulated at a frequency proportional to said angular velocity and modulated in space quadrature relative to each other, said modulated signal being arranged as a double sideband suppressed carrier signal, and combining means coupled for receiving the double sideband suppressed carrier signal and the third signal to develop a common signal at radio frequency having the third signal arranged as the carrier wave and the first and second signals arranged as double sidebands to the carrier wave.

4. A device for modulating first and second unmodulated microwave signals, each linearly polarized, and for combining such signals with an unmodulated reference microwave signal, also linearly polarized, to develop a microwave common signal with the first and second modulated signals being separable therefrom and the reference signal being arranged as the carrier wave, the first and second signals having relative voltage amplitudes indicative of desired information, comprising means for coupling the energy of the first and second signals with the linear polarization thereof diriected in planes orthogonal to each other, means for continuously rotating the linearly polarized planes of the coupled signal, a fixed member for accepting linearly polarized components of said first and second signal as a function of the cosine of the angles between the direction of linear polarization of the first and second signals and said fixed member to form said first and second modulated signal having voltage amplitudes modulated in a desired time relation relative to each other for separating said signals from the common signal, both signals arranged spectrally as a double sideband suppressed carrier signal, and means for combining the energy of the double sideband signal and the reference signal as the carrier wave to develop the microwave common signal having characteristics indicative of said relative amplitude of said first, second and reference signals.

5. A radar system for transmitting unmodulated radio frequency energy from a transmitting means and for receiving radio frequency echo signals, comprising antenna means for developing at radio frequency a sum signal, an elevation signal and an azimuth signal in response to said echo signal, said signals each having a selected direction of polarization and having a voltage amplitude indicative of desired information, means for coupling said elevation and azimuth signals so that the directions of polarization of the two signals are orthogonal to each other, modulating means for continually rotating said direction of polarization of said elevation and azimuth signals, means for accepting a cosine component of one of said elevation and azimuth energy signals and a sine component of the other as a function of the angle of rotation of the directions of polarization to develop modulated sideband signals, the modulation frequency being dependent upon the velocity of rotation, coupling means for combining the sideband signals and the sum signal as the carrier wave to develop a radio frequency common signal, mixing means for heterodyning the common signal to an intermediate frequency signal, amplifying means for amplifying said intermediate frequency signal, and detecting means including means to develop a reference signal indicative of the velocity of rotation of said modulator means for separating components of the elevation and azimuth signals from the amplified signal having characteristics indicative of the desired information.

6. A radar system for receiving unmodulated echo signals at radio frequency, comprising antenna means for responding to said echo signals to develop at radio frequency a sum signal and first and second difference signals having electric vectors polarized in orthogonal planes, the amplitude characteristics of said signals being indicative of desired information, rotating means coupled for rotating the planes of polarization of the difference signals at a desired angular frequency, a device having a fixed plane of acceptance coupled to the output of said rotating means for continually receiving desired components of the rotating signals as a function of the angle of rotation to develop modulated difference signals, coupling means coupled to said device for receiving said modulated difference signals and coupled to said antenna means for receiving said sum signal to develop a common signal at radio frequency, reference means coupled to said rotating means for developing reference signals indicative of the frequency of modulation of said common signal, and means coupled to said coupling means for separating the common signal in response to the reference signals to develop signals indicative of said amplitude characteristics of the sum and difference signals.

7. A radar system for receiving echo signals at radio frequency from a source having a varying direction relative to the axis of said antenna, comprising antenna means for receiving the echo signals and for developing a sum signal and for developing elevation and azimuth error signals having electric vectors lying in orthogonal planes, the error signals having amplitudes indicative of the direction of said source, modulator means coupled to said antenna means for continuously rotating the planes of polarization of the vectors and including means for developing a reference signal having a frequency proportional to the rate of rotation, a fixed microwave device for accepting components of the rotated vectors lying in a given plane as a function of the angle between the rotated vector and said fixed microwave device to develop modulated elevation and azimuth error signals which are modulated relative to each other in phase quadrature, a coupler coupled to said microwave device and said antenna means for combining the sum signal with the modulated error signals to develop a common signal at radio frequency, a mixer for heterodyning the common signal to intermediate frequency, and detecting means coupled to receive the reference signal and coupled to said mixer for developing output signals from the common signal having characteristics indicative of the direction of said source.

8. A radar system for transmitting microwave energy having unmodulated voltage amplitudes from a transmitting means and for intercepting the energy from a target, comprising antenna means for developing sum, elevation, and azimuth signals at microwave frequency in response to the energy intercepted from said target, said signals having given directions of polarization and having relative voltage amplitudes indicative of the direction of said target from said antenna means, means for coupling the elevation and azimuth signals so that their directions of polarization are in orthogonal planes, modulating means coupled for continually rotating at a desired velocity the directions of polarization of the coupled elevation and azimuth signals, means coupled to said modulating means for accepting a cosine component of one and a sine component of the other of the elevation and azimuth energy as a function of the angle of rotation of the directions of polarization to develop a sideband signal having voltage amplitudes of the elevation and azimuth signals modulated in time quadrature relative to each other, the modulation frequency being dependent upon the velocity of rotation of said modulating means, coupling means for combining the sideband signal with the sum signal as the carrier wave to develop a common signal, mixing means for heterodyning the common signal to an intermediate frequency signal, amplifying means coupled for amplifying the voltage of the intermediate frequency signal, and detecting means including means to develop a reference signal indicative of said velocity of rotation of said modulator means coupled for developing output signals from the intermediate frequency signal having characteristics indicative of the relative amplitudes of the sum, elevation and azimuth signals.

9. Means operative at radio frequency for developing a common signal from a first, second and third signal having electric vectors with amplitudes indicative of desired information, with the common signal having said first and second signals arranged as spectral sidebands to said third signal and with a selective frequency separation from said third signal, comprising means including a first orthogonal mode transducer coupled for coupling the electric vectors of the first and second signals into orthogonal planes relative to each other, rotating means for continually rotating the planes of the first and second signals at a selective angular velocity, a second orthogonal mode transducer coupled to said rotating means for presenting a fixed plane of acceptance of vectorial components as a function of the angle of rotation a cosine component of one and a sine component of the other of the rotating first and second signals so as to develop a double sideband signal, which includes the first and second signals each modulated in time relation relative to each other at a frequency proportional to the angular velocity, and coupling means including a third orthogonal mode transducer for coupling the vectorial components of said double sideband signal and said third signal into orthogonal planes, preset means coupled to said third transducer for rotating said orthogonal planes through a desired angle, a fourth orthogonal mode transducer coupled to said preset means for accepting as a function of the angle of rotation a cosine component of one and a sine component of the other of the rotated double sideband signal and the third signal and for combining the double sideband signal with the third signal as a carrier wave to develop a common signal having characteristics indicative of the desired information.

10. A radar system for developing a common signal at radio frequency from first and second signals at radio frequency which have electric vectors with amplitudes indicative of the relative magnitude of desired information and from a third signal at radio frequency having an electric vector with an amplitude for referencing the desired information, with the first and second signals being separable from the common signal, said system acting to vary the coupling ratio of the first and second signals with the third signal, comprising first transducer means for coupling the first and second signals into a first unified signal with the electric vector components thereof being orthogonally polarized, first signal rotating means coupled to said first transducer means for continually rotating said first unified signal, a first polarization sensitive element for accepting components of the electric vectors of the first and second signal which are in a given plane to develop a combined signal including the first and second signals amplitude modulated in a fixed phase relation for separating the first and second signals from the common signal, second transducer means connected for combining the combined signal and the third signal into a second unified signal with the electric vectors thereof being orthogonally polarized, second signal rotating means coupled for rotating said second polarized signal through a selective angle, and a second polarization sensitive element for receiving components of the combined signal and the third signal and for coupling said signals to develop a common signal with the selective angle determining the coupling ratio of the amplitudes of the combined signal relative to the third signal, the common signal having separable characteristics which include the relative magnitude of the desired information and a reference magnitude dependent upon the amplitude of the third signal and the selective angle.

11. A system operating at radio frequency for receiving first, second and third signals and for forming a common signal including said first and second signals modulated in a desired phase relation and including said third signal as the carrier wave, comprising modulator means including a transducer for providing the first and second signals in orthogonal planes, a half wave plate for continually rotating the planes of the first and second signals at a desired frequency, and means to accept cosine components of one of the rotating first and second signals and to accept sine components of the other of the rotating first and second signals, the components accepted being a function of the angle of rotation to thereby develop a modulated signal including the first and said second signals modulated in the desired phase relation, coupling means including a transducer to provide the modulated signal and the third signal in orthogonally polarized planes, a half wave plate for rotating said plane of energy from the coupling means through a preset angle, and means for accepting and combining cosine components of one and sine components of the other of the rotated modulated signal and the third signal, said components being a function of said preset angle, to thereby develop the desired common signal with the components of said third signal being arranged as the carrier wave and with the frequency of modulation of the first and the second signals being a function of the frequency of rotation of said half wave plate of said modulator means.

12. A system responsive at microwave frequency to first and second signals which are polarized in orthogonal planes and to a third signal which is linearly polarized for developing a common signal, comprising a rotating half wave plate for continually rotating the planes of the first and second signals, a transducer coupled to receive the rotated signals and having a rectangular output section for accepting desired components of the rotated signals in a fixed plane to develop a modulated signal, and coupling means coupled to combine the modulated signal and the third signal into the common signal.

13. A radar receiver for responding to unmodulated echo signals received from a target at radio frequency, comprising means to receive the echo signal and develop a sum signal in one direction of polarization and to develop orthogonally polarized azimuth and elevation error signals, said error signals having amplitudes indicative of the direction of said target relative to an axis of said antenna, modulating means coupled to said means to receive for receiving the elevation and azimuth error signals and including a continually rotating half wave plate for shifting the phase of components of the elevation and azimuth error signals in the plane of the plate relative to components of the signals out of the plane of said plate to rotate the direction of polarization of the elevation and azimuth error signals as a function of the angular velocity of said half wave plate, said half wave plate being rotatable at a variable angular velocity, means defining a polarization sensitive output plane coupled for accepting an azimuth and elevation error component of the rotating signals in the plane of acceptance, the accepted component being a cosine function of the angle between the rotated error signals and said output plane, to develop a modulated elevation and azimuth signal being phase separated and being at a frequency dependent upon the variable angular velocity, the modulated signals being arranged spectrally as double sidebands, coupler means coupled to said modulating means for receiving the modulated azimuth and elevation error signals and coupled to said means to receive for receiving the sum signal to develop a combined signal with the sum signal being arranged as a carrier wave to said double sidebands, means for amplifying the common signal, means coupled to said modulating means to develop a reference signal having a frequency dependent upon the variable angular velocity, and detecting means coupled to receive the common signal and coupled to said modulator for receiving the reference signal for separating said amplified elevation and error signals to develop output signals having characteristics indicative of direction of said target.

14. A radar system comprising fixed monopulse antenna means for receiving radio frequency echo signals indicative of directional error to develop a sum signal and a polarized azimuth and elevation signal all at radio frequency, transmitter means coupled to said antenna means for transmitting on an axis of said antenna means, first coupling means connected to said antenna means for receiving said azimuth and elevation signals and for coupling them with their electric vectors lying in orthogonal planes of polarization, a rotating half wave phase shifter for rotating the planes of the coupled azimuth and elevation signals, a member defining an output plane for receiving components of the azimuth and elevation error signals as a function of the cosine of the angles between the electric vectors and the output plane to develop modulated elevation and azimuth signals being modulated at different phase relations and to combine said modulated signals to develop a modulated error signal varying in phase relation to said azimuth and elevation signals so as to indicate the relative amplitude of the azimuth and elevation error signals, coupling means coupled to said modulator for receiving the modulated error signal and coupled to said antenna means for receiving the sum signal to develop a common error signal, means for amplifying the common error signal coupled to said coupling means, reference means coupled to said rotating half wave plate for developing reference signals indicative of the frequency of modulation of said common error signal, and detecting means coupled to said amplifying means responsive to the reference signals and the azimuth and elevation signals of said common signal to develop output signals indicative of the relative elevation and azimuth directional error.

15. A radar system for overcoming undesired signals which affect the sideband signals of the system comprising antenna means for receiving an echo signal from a target and for developing at microwave frequency a sum and a first and second error signal, said antenna means also receiving the undesired signals having frequencies different from the echo signals, each of the first and second signals having electric vector components polarized in a direction at right angles to the other, and the sum signal having electric vector components polarized in a direction parallel to one of the error signals, the error signals having amplitudes indicative of the relative direction of said target from an axis of said antenna and the sum signal having a reference magnitude for referencing the amplitudes of the error signals, first means for coupling the first and second error signals with their electric vector components polarized in orthogonal planes, rotating means coupled for rotating said planes of the error signals at a desired rate of angular velocity, a first polarization sensitive element for accepting a cosine component of one of the rotating error signals and a sine component of the other, the components accepted being a function of the angle of said rotating means and having electric vector components polarized at right angles to those of the sum signal to develop a double sideband signal having sideband components separated from each other at a frequency controlled by said rate of rotation, second means coupled to said antenna and to said polarized plane for coupling the sum signal and the double sideband signal with the electric vector components thereof polarized in orthogonal planes, a half wave plate coupled to said second means for rotating said planes of polarization through a preset rotation angle, a second polarization sensitive element coupled to said half waveplate for receiving a cosine component of either the sum signal or the sideband signal and for receiving a sine component of the other, said components received being a function of said desired rotation angle and combining with the sum signal arranged as the carrier wave to said sideband signals to develop a common signal at radio frequency, the common signal having electric vector components polarized in a fixed plane and including the sum and the sideband signal having relative amplitudes which vary with said preset angle of said half wave plate, a mixer coupler to heterodyne the common signal to intermediate frequency, amplifying means coupled to the mixer for amplifying the intermediate frequency common signal, means coupled to develop a reference signal at a frequency proportional to said rate of rotation of said rotating means, and detecting means coupled to receive the amplified signal and responsive to the reference signal to develop output signals having characteristics indicative of the direction of said source from said antenna axis, thereby providing a system where the angular velocity of said rotation means varies the frequency separation between the sideband signals and carrier wave and where the preset rotation angle of said variable coupler changes the relative amplitude of the sum signal and the error signals to overcome the effect of the undesired signals.

16. A radar system for receiving radio frequency echo signals from a target comprising antenna means for responding to the echo signal to develop at microwave frequency a sum and a first and second error signal having amplitudes indicative of the direction of said target from an axis of said antenna means, the sum and error signals having polarized electric vectors, first coupling means to combine the first and second error signals with their electric vectors polarized in orthogonal planes, a rotatable half wave plate for rotating said electric vectors in said planes at a selective angular velocity, a first polarization sensitive element having a directional plane for receiving components of the error signals proportional to a cosine of one error signal and a sine of the other as a function of the angle between the rotated vector and said directional plane of said polarization sensitive element to develop a modulated signal including the first and second error signals having a phase difference and arranged spectrally as double sideband signals, means for coupling the modulated signal and the sum signal with their electric vectors polarized in orthogonal planes, means for rotating said orthogonal planes through a variable preset angle, a second polarization sensitive element having a directional plane for receiving components proportional to a cosine of one of the modulated signal and the sum signal and a sine of the other as a function of the angle between the rotated signal and said directional plane of said second polarization sensitive element to develop a common signal including the double sideband signals and the sum signal as the carrier signal, the position of said variable angle changing the relative amplitudes of the carrier signals and the sideband signals, a mixer for heterodyning the common signal to intermediate frequency, an amplifier for amplifying the intermediate frequency common signal, means coupled to said rotatable half wave plate for developing reference signals indicative of said angular velocity, and detecting means coupled to said amplifier for responding to the reference signal and to the common signal to develop output signals indicative of the direction of said target relative to said antenna axis.

17. A radar system for receiving unmodulated directional echo signals at radio frequency from a source, comprising antenna means for developing from the echo signals a sum signal, an elevation error signal, and an azimuth error signal, the signals being linearly polarized and having amplitudes indicative of the direction of said source from an axis of said antenna, a first orthogonal mode transducer having a first rectangular waveguide section for receiving the elevation error signal linearly polarized in either a first or a second direction, having a second rectangular waveguide section for receiving the azimuth signal linearly polarized in the other direction and having a square waveguide section for coupling the error signals into a first orthogonally polarized signal, a rotating half wave plate including a first and second septum arranged for shifting the phase of components of the error signals in the plane of said septums to rotate the orthogonally polarized signals, said half wave plate being continuously rotated at a desired angular velocity, a second orthogonal mode transducer having a square waveguide section coupled to said rotated half wave plate for receiving the rotated signals and including a rectangular waveguide section for receiving components of the error signals polarized in said second direction to thereby develop a carrier suppressed signal including the error signals modulated in phase quadrature relative to each other, a third orthogonal mode transducer having a first rectangular waveguide section coupled to receive the modulated signals linearly polarized in either said first or second direction, having a second rectangular waveguide section coupled for receiving the sum signal linearly polarized in the other direction and having a square waveguide section for coupling the signals into a second orthogonally polarized signal, a second half wave plate having a first and second septum and coupled for being rotated to a desired angle so as to rotate the orthogonally polarized error signal and sum signal through a desired angle, a fourth orthogonal mode transducer having a square waveguide section coupled to said half wave plate for receiving the rotated signals and having a rectangular waveguide section for receiving components of the rotated signal linearly polarized in said second direction to develop a common signal, a mixer coupled to heterodyne the common signal to intermediate frequency, an amplifier coupled to said mixer for amplifying the intermediate frequency signal, a reference signal generator coupled to said first half wave plate for developing reference signals indicative of the angular velocity of rotation, and detecting means coupled to said amplifier for developing signals in response to the reference signal indicative of said direction of said source.

18. A system for providing three separable information bearing signal components in a single signal channel in response to three different signals, and comprising: means responsive to two of the signals for disposing the two signals in rotated orthogonal relationship; means responsive to the orthogonally disposed signals for modulating them in space quadrature at a referenced frequency; means for combining the modulated signals with the third signal and means responsive to the combined signal and to the referenced frequency of the means for modulating for separating the components of the combined signal disposed in orthogonal relationship into two separate components.

19. A system for developing at microwave frequency a common signal from a first and second signal being polarized in orthogonal planes and a third signal linearly polarized in the plane of either the first or second signal, comprising a device coupled for rotating the planes of the first and second signals, a first transducer having a polarization sensitive plane for receiving cosine components of the rotating first and second signals as a function of the angle between the planes of the first and second signals and the polarization sensitive plane to develop a modulated signal being linearly polarized, a second transducer for coupling the modulated signal and the third signal into orthogonal planes, a variable coupling device for rotating the planes of the modulated signal and the third signal through a preset angle, and a third transducer having a polarization sensitive plane for receiving components of the rotated modulated and third signal as a function of the angles between the rotated planes of the modulated and the third signal and the polarization sensitive plane of the third transducer to develop the common signal.

* * * * *